(12) United States Patent
Wan

(10) Patent No.: US 11,698,954 B2
(45) Date of Patent: *Jul. 11, 2023

(54) METHODS AND SYSTEMS FOR USER AUTHENTICATION

(71) Applicant: Comcast Cable Communications, LLC, Philadelphia, PA (US)

(72) Inventor: Fei Wan, Warrington, PA (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/314,912

(22) Filed: May 7, 2021

(65) Prior Publication Data

US 2022/0067134 A1    Mar. 3, 2022

Related U.S. Application Data

(63) Continuation of application No. 16/132,192, filed on Sep. 14, 2018, now Pat. No. 11,030,291.

(51) Int. Cl.
*G06F 3/16* (2006.01)
*G06F 21/32* (2013.01)
*G06V 40/20* (2022.01)
*G06V 40/16* (2022.01)

(52) U.S. Cl.
CPC .............. *G06F 21/32* (2013.01); *G06F 3/167* (2013.01); *G06V 40/165* (2022.01); *G06V 40/20* (2022.01)

(58) Field of Classification Search
CPC ......... G06F 21/32; G06F 3/167; G06V 40/20; G06V 40/165; G06K 9/00; G06K 9/00248; G06K 9/00335
See application file for complete search history.

(56) References Cited

U.S. PATENT DOCUMENTS

| 9,405,967 | B2 * | 8/2016 | Samet | G06F 21/44 |
| 2004/0107106 | A1 * | 6/2004 | Margaliot | G06T 13/00 |
| | | | | 704/E21.02 |
| 2005/0162432 | A1 | 7/2005 | Ballin et al. | |
| 2010/0305928 | A1 | 12/2010 | Cohen et al. | |

FOREIGN PATENT DOCUMENTS

WO    2017025573 A1    2/2017

* cited by examiner

*Primary Examiner* — Tuan H Nguyen
(74) *Attorney, Agent, or Firm* — Ballard Spahr LLP

(57) ABSTRACT

A user device, such as a smartphone or laptop, may be password (passphrase) protected. The user device may combine biometric input analysis, such as facial recognition, with viseme analysis to authenticate a user attempting to use a password (passphrase) to access the user device. Secure authentication methods and systems are described that account for variations in how, based on the user's emotion (e.g., mood, temperament, unique pronunciation, etc. . . . ), a password (passphrase) may be presented to the user device.

20 Claims, 10 Drawing Sheets

METHODS AND SYSTEMS FOR USER AUTHENTICATION

CROSS-REFERENCE TO RELATED APPLICATION

This application is a continuation of U.S. application Ser. No. 16/132,192, filed Sep. 14, 2018, the entirety of which is incorporated by reference herein.

BACKGROUND

Security for devices is important to prevent unauthorized access to sensitive information. Passwords are routinely used as a security measure. However, passwords may be easily compromised either through guessing (by unauthorized users) or broken by a password cracking program.

SUMMARY

It is to be understood that both the following general description and the following detailed description are example and explanatory only and are not restrictive. Methods and systems are described for user authentication. Multiple authentication techniques may be used to authenticate a user of a user device, such as a smartphone, a computer, a media device, and the like. A user device may combine biometric analysis, such as facial recognition, with lip reading and password analysis (e.g., viseme analysis) to provide secure user authentication. The biometric analysis, the lip reading, and the password analysis may be sufficiently discriminant to authenticate a user speaking a password in various tones, at different speeds, using various facial expressions, and the like.

This summary is not intended to identify critical or essential features of the disclosure, but merely to summarize certain features and variations thereof. Other details and features will be described in the sections that follow.

DETAILED DESCRIPTION

Figure 1:
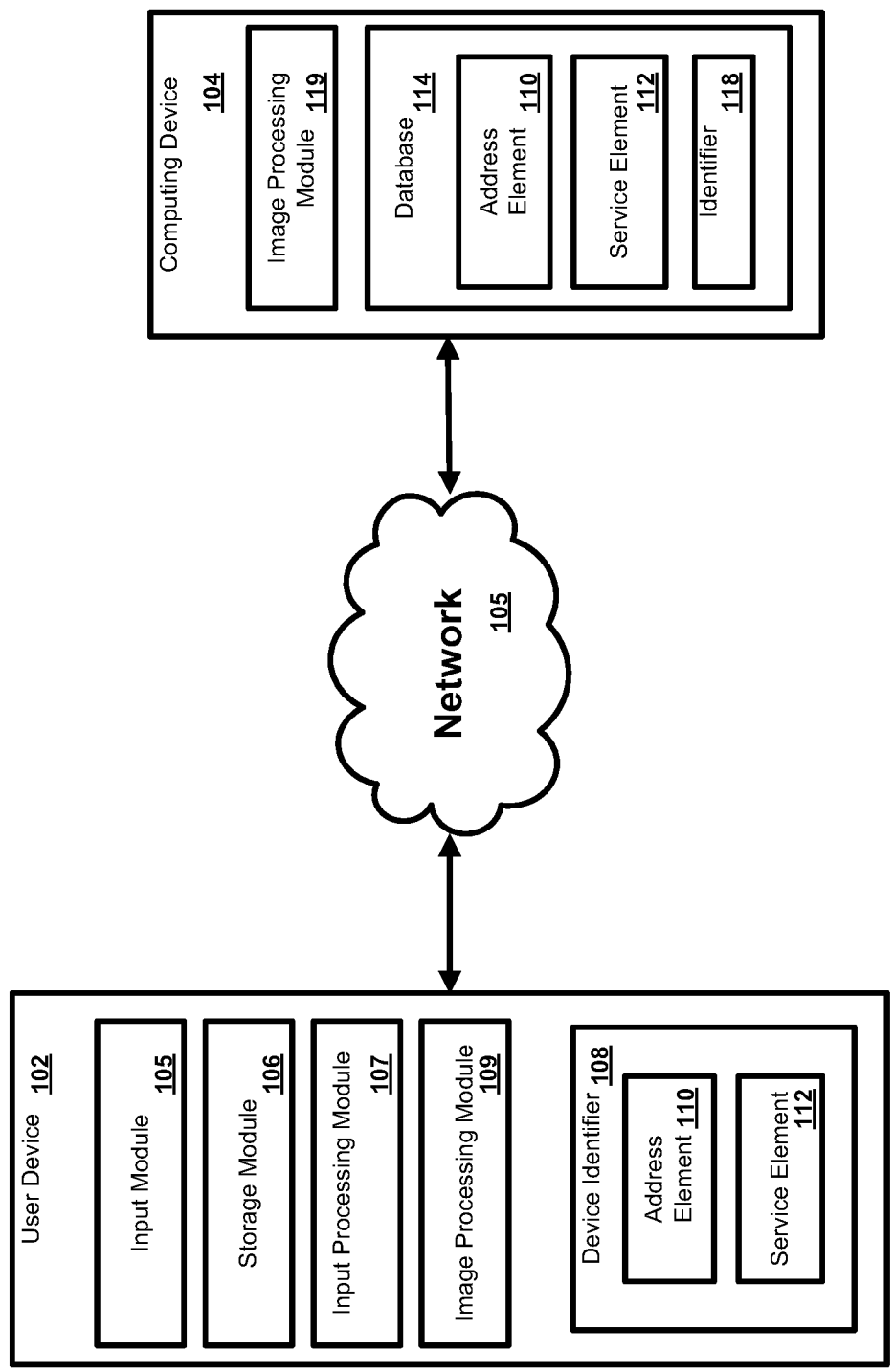
FIG. 1 shows a system for user authentication.

As used in the specification and the appended claims, the singular forms "a," "an," and "the" include plural referents unless the context clearly dictates otherwise. Ranges may be expressed herein as from "about" one particular value, and/or to "about" another particular value. When such a range is expressed, another configuration includes from the one particular value and/or to the other particular value. Similarly, when values are expressed as approximations, by use of the antecedent "about," it will be understood that the particular value forms another configuration. It will be further understood that the endpoints of each of the ranges are significant both in relation to the other endpoint, and independently of the other endpoint.

"Optional" or "optionally" means that the subsequently described event or circumstance may or may not occur, and that the description includes examples where said event or circumstance occurs and examples where it does not.

Throughout the description and claims of this specification, the word "comprise" and variations of the word, such as "comprising" and "comprises," means "including but not limited to," and is not intended to exclude, for example, other components, integers or steps. "Such as" is not used in a restrictive sense, but for explanatory purposes.

It is understood that when combinations, subsets, interactions, groups, etc. of components are disclosed that while specific reference of each various individual and collective combinations and permutation of these may not be explicitly disclosed, each is specifically contemplated and described herein. This applies to all parts of this application including, but not limited to, steps in described methods. Thus, if there are a variety of additional steps that may be performed it is understood that each of these additional steps may be performed with any specific configuration or combination of configurations of the described methods.

As will be appreciated by one skilled in the art, hardware, software, or a combination of software and hardware may be implemented. Furthermore, a computer program product on a computer-readable storage medium (e.g., non-transitory) having processor-executable instructions (e.g., computer software) embodied in the storage medium. Any suitable computer-readable storage medium may be utilized including hard disks, CD-ROMs, optical storage devices, magnetic storage devices, memresistors, Non-Volatile Random Access Memory (NVRAM), flash memory, or a combination thereof.

Throughout this application reference is made to block diagrams and flowcharts. It will be understood that each block of the block diagrams and flowcharts, and combinations of blocks in the block diagrams and flowcharts, respectively, may be implemented by processor-executable instructions. These processor-executable instructions may be loaded onto a general purpose computer, special purpose computer, or other programmable data processing apparatus to produce a machine, such that the processor-executable instructions which execute on the computer or other programmable data processing apparatus create a device for implementing the functions specified in the flowchart block or blocks.

These processor-executable instructions may also be stored in a computer-readable memory that may direct a computer or other programmable data processing apparatus to function in a particular manner, such that the processor-executable instructions stored in the computer-readable memory produce an article of manufacture including processor-executable instructions for implementing the function specified in the flowchart block or blocks. The processor-executable instructions may also be loaded onto a computer or other programmable data processing apparatus to cause a series of operational steps to be performed on the computer or other programmable apparatus to produce a computer-implemented process such that the processor-executable instructions that execute on the computer or other programmable apparatus provide steps for implementing the functions specified in the flowchart block or blocks.

Accordingly, blocks of the block diagrams and flowcharts support combinations of means for performing the specified functions, combinations of steps for performing the specified functions and program instruction means for performing the specified functions. It will also be understood that each block of the block diagrams and flowcharts, and combinations of blocks in the block diagrams and flowcharts, may be implemented by special purpose hardware-based computer systems that perform the specified functions or steps, or combinations of special purpose hardware and computer instructions.

Note that this detailed description may refer to a given entity performing some action. It should be understood that this language may in some cases mean that a system (e.g., a computer) owned and/or controlled by the given entity is actually performing the action.

User authentication is described. Multiple authentication techniques may be used to authenticate a user of a user device, such as a smartphone, a computer, a media device, and the like. A user device may combine biometric analysis, such as facial recognition, with lip reading and password analysis (e.g., viseme analysis) to provide secure user authentication.

A user device may comprise one or more security features intended to prevent unauthorized access to the user device and/or information associated/configured with the user device. As a security feature, the user device may require a password, a passphrase, or the like to enable access to the user device and/or information associated/configured with the user device. For example, the user device may require a user to provide a password, a passphrase, or the like to cause the user device to transition from a locked state to an unlocked state. The password or passphrase may be provided to the user device audibly. For example, the user may speak the password or passphrase into a microphone of the user device. As additional security features, the user device may require the user to provide a biometric input, such as a facial image, and analyze the user's pattern of speech when articulating the password, the passphrase, or the like. Combining the biometric input with a spoken password enables the user to provide the password/passphrase to the user device while merely mouthing (e.g., forming a viseme or phoneme without producing sound, etc. . . . ) the password/passphrase. For example, whether a user speaks a password/passphrase or the user uses their mouth to form/produce the password/passphrase without producing a sound of/associated with the password, the user device may analyze the spoken/mouthed password/passphrase along with the biometric input to authenticate the user.

The user device may detect and/or determine that the user is attempting to access the user device and the user device may provide a notification, an indication, or the like to/for the user to provide a password, a passphrase, or the like before access to the user device is granted. The password, the passphrase, or the like may be an audible password, an audible passphrase, or the like spoken by the user, for example. The user device may use natural language and/or speech-to-text processing to convert the audible password (or audible passphrase) to text and/or data indicative of the audible password (or audible passphrase). The text and/or data indicative of the audible password (or audible passphrase) may be processed further to determine whether the text and/or data indicative of the audible password/passphrase (or non-audible password/passphrase) matches stored information (e.g., a stored password, a stored passphrase, etc. . . . ) associated with the user device and/or user. The password, the passphrase, or the like may be non-audible. For example, the password, the passphrase, or the like may be mouthed and/or provided to the user device without sound. The user device may use may extract oral components (e.g., lip structures, visemes, etc. . . . ) associated with the pronunciation/articulation of the mouthed/non-audible password/passphrase.

Facial components may be extracted from one or more images (e.g., photographs, video, etc. . . . ) of a person providing the audible password/passphrase (or non-audible password/passphrase). An identity of the person may be determined and/or whether the person should be granted access to the user device (e.g., whether the user is authorized to use the user device, etc. . . . ) based, at least in part, on a match/comparison of the extracted facial components and stored facial components (e.g., stored facial components of an authorized user, etc. . . . ). The match/comparison may be based on an error/discrepancy threshold and/or tolerance. Error correction and/or normalization may be used to account for the error/discrepancy threshold and/or tolerance.

Additional information from the captured one or more images. Oral components (e.g., lip structures, visemes, etc. . . . ) associated with the pronunciation/articulation of the audible password/passphrase (or non-audible password/passphrase) may be extracted. For example, the user device may generate/extract a sequence of images (e.g., extracted from the captured one or more images) of the person's lips when the person provides the audible password/passphrase (or non-audible password/passphrase). The user device may generate, determine, and/or classify a sequence of visemes that correspond to the sequence of images of the person's lips when the person provides the audible password/passphrase (or non-audible password/passphrase). The sequence of visemes may be compared/matched to a plurality of stored visemes to determine if the person's lip structure made when providing the audible password/passphrase (or non-audible password/passphrase) matches stored information (e.g., a stored password, a stored passphrase, etc. . . . ) associated with the user device and/or person. The match/comparison between the sequence of visemes and the plurality of stored visemes may be based on an error/discrepancy threshold and/or tolerance. The match/comparison between the sequence of visemes and the plurality of stored visemes may comprise error correction and/or normalization which accounts for the error/discrepancy threshold and/or tolerance. The error correction and/or normalization may enable discriminate identification of the sequence of visemes associated with the person and/or identification of the person. For example, the user device may correlate the sequence of visemes to stored visemes despite external factors such as lighting, angle, and the like associated with the captured one or more images from with the sequence of visemes are extracted/determined. The user device may use fuzzy logic to correlate the sequence of visemes to stored visemes. The user device may correlate the sequence of visemes to stored visemes despite factors such as the person's emotion (e.g., mood, temperament, unique pronunciation, etc. . . . ) when providing the audible password/passphrase (or non-audible password/passphrase). For example, a person's emotion (e.g., mood, temperament, unique pronunciation, etc. . . . ) may be determined according to factors such as tone, inflection, or other attributes of articulation. Despite factors such as tone, inflection, and other attributes of articulation, each viseme associated with each sound (e.g., phoneme) made when speaking an audible password/passphrase (or non-audible password/passphrase) should be the same (e.g., substantially the same) each time the person speaks/provides an audible password/passphrase (or non-audible password/passphrase). Therefore, the user device may correlate the sequence of visemes to stored visemes despite factors such as the person's emotion (e.g., mood, temperament, unique pronunciation, etc. . . . ) when providing the audible password/passphrase (or non-audible password/passphrase).

A person may be granted access to the user device based on satisfaction of one or more of a match between a typed password (or passphrase) and an audible password/passphrase (or non-audible password/passphrase), a match between facial features extracted from the person to stored facial features associated with the person, and/or a match between a sequence of visemes associated with an audible password/passphrase (or non-audible password/passphrase) to stored visemes.

FIG. 1 shows an example system for user authentication. The system may comprise a user device 102. The user device 102 may be an electronic device such as a smartphone, a computer, a laptop, a tablet, or any other device. The user device 102 may be associated with a device identifier 108. The device identifier 108 may be any identifier, token, character, string, or the like, for differentiating one user or user device (e.g., user device 102) from another user or user device. The device identifier 108 may identify a user or user device as belonging to a particular class of users or user devices. As a further example, the device identifier 108 may comprise information relating to the user device such as a manufacturer, a model or type of device, a service provider associated with the user device 102, a state of the user device 102, a locator, and/or a label or classifier. Other information may be represented by the device identifier 108.

The device identifier 108 may comprise an address element 110 and a service element 112. The address element 110 may comprise or provide an internet protocol address, a network address, a media access control (MAC) address, an Internet address, or the like. For example, the address element 110 may be relied upon to establish a communication session between the user device 102 and a computing device 104 or other devices and/or networks. As a further example, the address element 110 may be used as an identifier or locator of the user device 102. The address element 110 may be persistent for a particular network.

The service element 112 may comprise an identification of a service provider associated with the user device 102 and/or with the class of user device 102. The class of the user device 102 may be related to a type of device, capability of device, type of service being provided, and/or a level of service (e.g., business class, service tier, service package, etc.). For example, the service element 112 may comprise information relating to or provided by a communication service provider (e.g., Internet service provider) that is providing or enabling data flow such as communication services to the user device 102. The service element 112 may comprise information relating to a preferred service provider for one or more particular services relating to the user device 102. The address element 110 may be used to identify or retrieve data from the service element 112, or vice versa. As a further example, one or more of the address element 110 and the service element 112 may be stored remotely from the user device 102 and retrieved by one or more devices such as the user device 102 and the computing device 104. Other information may be represented by the service element 112.

The user device 102 may combine biometric analysis, such as facial recognition, with lip reading and password analysis (e.g., viseme analysis) to provide secure user authentication. The user device 102 may combine any type of biometric analysis (e.g., facial recognition, fingerprint/hand analysis, iris scan, voice analysis, etc. . . . ) with lip reading and password analysis (e.g., viseme analysis) to provide secure user authentication. The user device 102 may prevent unauthorized access to the user device 102 and/or information associated/configured with the user device 102. The user device 102 may require a password, a passphrase, or the like. The user device 102 may require may require a password, a passphrase, or the like to enable access to the user device 102 and/or information associated/configured with the user device 102. For example, the user device 102 may require a person to provide a password, a passphrase, or the like to cause the user device 102 to transition from a locked state to an unlocked state.

The user device 102 may comprise an input module 105 for providing an interface to a person to interact with the user device 102 and/or any other device (e.g., the computing device 104). The input module 105 may be any interface for presenting and/or receiving information to/from the person, such as an input (e.g., a facial image, a biometric input, a password, a password, etc. . . . ). For example, the input module 105 may receive a password, a passphrase, or the like from a person attempting to gain access to the user device 102 and/or information associated/configured with the user device 102. The user device 102 may detect and/or determine that the person is attempting to access the user device 102 and the user device 102 may provide a notification, an indication, or the like to/for the person to provide the password, the passphrase, or the like before access to the user device 102 is granted. For example, the input module 105 may comprise a keyboard, a touchscreen, a touchpad, or the like that the person may use to type/input the password, the passphrase, or the like. The user device 102 may store the password, the passphrase, or the like in a storage module 106 (or any other storage location). The user device 102 may retrieve the password, the passphrase, or the like from the storage module 106 (or any other storage location). The password, the passphrase, or the like stored in the storage module 106 may be stored for authentication purposes during (as part of) a registration/enrollment process. The registration/enrollment process may be performed, for example, when the person configures security settings for the user device 102. The notification, the indication, or the like for the person to provide the password, the passphrase, or the like before access to the user device 102 is granted may also instruct/request the person to provide an audible version of the password, the passphrase, or the like. The input module 105 may comprise a microphone (e.g., a sensor, a voice capturing component, etc. . . . ). The input module 105 may receive (or detect) the audible version of the password, the passphrase, or the like via the microphone. The input module 105 may receive any type of biometric input, such as finger/hand prints, iris scans, voice input, etc. . . . ).

The input module 105 may provide the audible password (or audible passphrase) to an input processing module 107. The input processing module 107 may use natural language and/or speech-to-text processing to convert the audible password (or audible passphrase) to text and/or data indicative of the audible password (or audible passphrase) that may be processed further to determine whether the text and/or data indicative of the audible password (or audible passphrase) matches the password, the passphrase, or the like typed/input by the person and via the by the input module 105. The text and/or data indicative of the audible password (or audible passphrase) may be processed further to determine whether the text and/or data indicative of the audible password (or audible passphrase) matches information (e.g., a stored password, a stored passphrase, etc. . . . ) associated with the user device and/or person stored in the storage module 106. The information (e.g., the stored password, the stored passphrase, etc. . . . ) associated with the user device and/or person stored in the storage module 106 may be stored for authentication purposes during (as part of) a registration/enrollment process. The registration/enrollment process may be performed, for example, when the person configures security settings for the user device 102. The input process module 106 may process any type of biometric input and/or information associated with a biometric input, such as finger/hand prints, iris scans, voice input, etc. . . . ).

The input module 105 may comprise a camera (e.g., an image capturing device, etc. . . . ). The camera may capture one or more images (e.g., photographs, video, etc. . . . ) of a face of the person providing the audible password/passphrase (or non-audible password/passphrase). The input module 105 may provide the one or more images of the face to an image processing module 109. The image processing module 109 may extract facial components of the person from the one or more images of the person's face. Facial components may comprise precise measurements and/or descriptions associated with a person's face such as the person's nose, eyes, lips, ears, distinguishing marks (e.g., moles, birthmarks, blemishes, tattoos, etc. . . . ), facial dimensions, reference points, and the like. The extracted facial components may be stored in the storage module 106 (or any other storage location). For example, one or more images of the person (e.g., images capturing the person's face) and/or extracted facial components may be stored for authentication purposes during (as part of) a registration/enrollment process. The registration/enrollment process may be performed, for example, when the person configures security settings for the user device 102.

The user device 102 (e.g., the image processing module 109) may determine an identity of the person and/or whether the person should be granted access to the user device 102 (e.g., whether the person is authorized to use the user device 102, etc. . . . ) based, at least in part, on a match/comparison of the facial components of the person extracted from the one or more images to stored facial components (e.g., stored facial components of an authorized person, etc. . . . ). The match/comparison between facial components of the person extracted from the one or more images and stored facial components may be based on an error/discrepancy threshold and/or tolerance. The matching/comparison between the facial components of the person extracted from the one or more images and the stored facial components may comprise error correction and/or normalization which accounts for the error/discrepancy threshold and/or tolerance. The error correction and/or normalization may enable discriminate identification of facial components associated with the person and/or identification of the person. For example, the image processing module 109 may identify a person's face (e.g., facial components) despite external factors such as lighting, angle, and the like associated with the captured one or more images. The image processing module 109 may use fuzzy logic to identify a person's face.

The image processing module 109 may identify the person's face (e.g., facial components) despite factors such as the person's emotion (e.g., mood, temperament, unique pronunciation, etc. . . . ) when providing the audible password/passphrase (or non-audible password/passphrase). The image processing module 109 may use reference points (e.g., facial components, etc. . . . ) from the captured one or more images to identify the person's face. For example, an image of the one or more images may comprise reference points (e.g., facial components, etc. . . . ) that correspond to reference points of another image. The image processing module 109 may match/compare the points associated with the image to corresponding reference points of the other image. For example, a match/comparison between reference points from the respective images may indicate that the person faces are the same (e.g., substantially the same). The match/comparison between the reference points may be based on an error/discrepancy threshold and/or tolerance. For example, each reference point may not have to match. A threshold may be satisfied if only two reference points of the image match two reference points of the other image. An image may comprise any number of reference points (e.g., facial components). The threshold may be any value and/or setting.

The image processing module 109 may extract additional information from the captured one or more images. The image processing module 109 may extract oral components (e.g., lip structures, visemes, etc. . . . ) associated with the pronunciation/articulation of the audible password/passphrase (or non-audible password/passphrase). For example, the image processing module 109 may generate/extract a sequence of images (e.g., extracted from the captured one or more images) of the person's lips when the person provides the audible password/passphrase (or non-audible password/passphrase). The image processing module 109 may generate, determine, and/or classify a sequence of visemes that correspond to the sequence of images of the person's lips when the person provides the audible password/passphrase (or non-audible password/passphrase). Each image of the sequence of images (e.g., extracted from the captured one or more images) of the person's lips may be associated with a timestamp. The timestamps may be used to correlate lip movements (e.g., visemes) associated with the audible password/passphrase (or non-audible password/passphrase) with a stored sequence of visemes (e.g., stored in the storage module 106, etc. . . . ) associated with an audible password/passphrase (or non-audible password/passphrase) captured/determined during a registration/enrollment process. The registration/enrollment process may be performed, for example, when the person configures security settings for the user device 102.

A time series recording (e.g., a plurality of time stamped images, etc. . . . ) of the person speaking the audible password/passphrase (or non-audible password/passphrase) may comprise a plurality of visemes used to articulate the audible password/passphrase (or non-audible password/passphrase). The sequence of visemes (e.g., timestamps associated with the sequence of visemes, etc. . . . ) may be compared/matched to the stored sequence of visemes (e.g., timestamps associated with the stored sequence of visemes, etc. . . . ) to determine if the person's lip structure made when providing the audible password/passphrase (or non-audible password/passphrase) matches stored information (e.g., a stored password, a stored passphrase, etc. . . . ) associated with the user device and/or person. Despite factors such as tone, inflection, and other attributes of articulation, each viseme associated with each sound (e.g., phoneme) made when speaking the audible password/passphrase (or non-audible password/passphrase) should be the same (e.g., substantially the same) each time the person speaks/provides an audible password/passphrase (or non-audible password/passphrase). The match/comparison between the sequence of visemes and the stored sequence visemes may be based on an error/discrepancy threshold and/or tolerance. The match/comparison between the sequence of visemes and the stored sequence of visemes may comprise error correction and/or normalization which accounts for the error/discrepancy threshold and/or tolerance. The error correction and/or normalization may enable discriminate identification of the sequence of visemes associated with the person and/or identification of the person. For example, the image processing module 109 may correlate the sequence of visemes (e.g., timestamps associated with the sequence of visemes) to a stored sequence visemes (e.g., timestamps associated with the stored sequence of visemes) despite external factors such as lighting, angle, and the like associated with the captured one or more images from which the sequence of visemes are extracted/determined. The user device may use fuzzy logic to correlate the sequence of visemes to a stored sequence of visemes.

The image processing module 109 may correlate the sequence of visemes to the stored sequence of visemes despite factors such as the person's emotion (e.g., mood, temperament, unique pronunciation, etc. . . . ) when providing the audible password/passphrase (or non-audible password/passphrase). The image processing module 109 may use reference points (e.g., facial components, etc. . . . ) to correlate a viseme of a sequence of visemes to a viseme of a stored sequence of visemes. For example, the viseme of the sequence of visemes may comprise reference points (e.g., facial components, etc. . . . ) that correspond to reference points of the viseme of the stored sequence of visemes. The image processing module 109 may match/compare the reference points associated with the viseme of the sequence of visemes to corresponding reference points of the viseme of the stored sequence of visemes. For example, a match/comparison between reference points from the viseme of the sequence of visemes to the viseme of the stored sequence of visemes may indicate that the respective visemes are the same (e.g., substantially the same). An inability to match/compare reference points from the viseme of the sequence of visemes to the viseme of the stored sequence of visemes may indicate that the respective visemes are different. The match/comparison between the reference points may be based on an error/discrepancy threshold and/or tolerance. For example, each reference point may not have to match. A threshold may be satisfied if only two reference points of a viseme of the sequence of visemes match two reference points of a viseme of the other image. A sequence of visemes may comprise any number of reference points (e.g., facial components). The threshold may be any value and/or setting.

As an example, the image processing module 109 may use a first image of a sequence of images to determine a plurality of points of interest (POIs) associated with a person's lips as the person articulates an audible password/passphrase (or non-audible password/passphrase). The image processing module 109 may determine POIs associated with a viseme or plurality of visemes. The image processing module 109 may determine POIs associated with a left lip corner (LLC), a right lip corner (RLC), a lower lip (LL), an upper lip (UL), or the like of the person's lips as the lips form a viseme. The image processing module 109 may determine distances between the POIs. For example, the image processing module 109 may determine a horizontal distance (DH) between the left lip corner (LLC) and the right lip corner (RLC), and/or a vertical distance (DV) between the lower lip (LL) and the upper lip (UL). Further, the image processing module 109 may determine a region of interest (ROI) associated with the person articulating the audible password/passphrase (or non-audible password/passphrase). For example, the image processing module 109 may determine an area (DA) inside the person's mouth as a ROI. The image processing module 109 may determine/track the POIs and ROI for each image of the sequence of images.

The image processing module 109 may determine a plurality of vectors associated with the distances, POIs, and/or ROI determined for each image (e.g., viseme) of the sequence of images (e.g., plurality of viseme, etc. . . . ). For example, a vector (e.g., DH) may be associated with the distance (e.g., horizontal distance, etc. . . . ) between the left lip corner (LLC) and the right lip corner (RLC), and/or a vector (e.g., DV) may be associated with the distance (e.g., vertical distance, etc. . . . ) between the lower lip (LL) and the upper lip (UL). The image processing module 109 may determine a vertical vector ($V_{DV}$) for the vertical distance (DV) between the lower lip (LL) and the upper lip (UL), a horizontal vector ($V_{DH}$) for the horizontal distance (DH) between the left lip corner (LLC) and the right lip corner (RLC), and area vector ($V_{DA}$) for the region of interest (DA) between the person's lips for each image of the sequence of images. The plurality of vectors may be stored in a temporal order (e.g., an order in which they occur in the sequence of images). The image processing module 109 may use the plurality of vectors to determine normalized vectors. For example, the image processing module 109 may use a maximum number of each type of vector (e.g., $V_{DH}$, $V_{DV}$, $V_{DA}$, etc. . . . ) determined from the sequence of images to normalize each vector of the plurality of vectors. The image processing module 109 may store the normalized vectors (e.g., $V_{ONDH}$, $V_{ONDV}$, $V_{ONDA}$, etc. . . . ) during a registration/enrollment process. The image processing module 109 may use the normalized vectors as reference vectors for subsequent analysis of a person articulating an audible password/passphrase (or non-audible password/passphrase). For example, the image processing module 109 may process a person articulating an audible password/passphrase (or non-audible password/passphrase), subsequent to the registration/enrollment process, in the manner described. The image processing module 109 may determine a new set of normalized vectors (e.g., $V_{NDH}$, $V_{NDV}$, $V_{NDA}$, etc. . . . ) from the person articulating the audible password/passphrase (or non-audible password/passphrase). The image processing module 109 may compare the new normalized vectors (e.g., $V_{NDH}$, $V_{NDV}$, $V_{NDA}$, etc. . . . ) to the original normalized vectors (e.g., $V_{ONDH}$, $V_{ONDV}$, $V_{ONDA}$, etc. . . . ) determined from the registration/enrollment process. If distances associated with the new vectors and the respective original vectors are within a threshold, then the person articulating the audible password/passphrase (or non-audible password/passphrase) may be confirmed as the original person that articulated the audible password/passphrase (or non-audible password/passphrase) during the registration/enrollment process.

The user device 102 may grant the person access to the user device 102 based on satisfaction of one or more of the one or more security features described. For example, the person may be granted to access the user device 102 and/or information associated/configured with the user device 102 based on a match between a typed password (or passphrase) and an audible password/passphrase (or non-audible password/passphrase), a match between facial features extracted from a person to stored facial features associated with the person, a match between a sequence of visemes associated with an audible password/passphrase (or non-audible password/passphrase) to stored visemes, and/or a match between normalized vectors determined from a person articulating an audible password/passphrase (or non-audible password/passphrase) and normalized vectors (e.g., $V_{ONDH}$, $V_{ONDV}$, $V_{OND4}$, etc. . . . ) determined from the person articulating the audible password/passphrase (or non-audible password/passphrase) during a registration/enrollment process.

The user device 102 may detect and/or determine that the person is attempting to access the user device 102 and the user device 102 may provide a notification, an indication, or the like to/for the person to provide a password, the passphrase, or the like before access to the user device 102 is granted. The notification, the indication, or the like for the person to provide the password, the passphrase, or the like before access to the user device 102 is granted may instruct/request the person to provide an audible version of the password. The user device 102 may capture one or more images (e.g., photographs, video, etc. . . . ) of a face of the person providing the audible password/passphrase (or non-audible password/passphrase). The user device 102 may provide the one or more images of the person's face to the computing device 104.

The user device 102 may be in communication with a computing device 104. The computing device 104 may be disposed locally or remotely relative to the user device 102. For example, the user device 102 and the computing device 104 may be in communication via a private and/or public network 105 such as the Internet or a local area network. Other forms of communications may be used such as wired and wireless telecommunication channels, for example.

The computing device 104 may be a device such as server, cloud-based device, or the like for communicating with the user device 102. For example, the computing device 104 may communicate with the user device 102 for providing information/data and/or receiving information/data, such as the one or more images of the face. Further, the computing device 104 may provide services such as network (e.g., Internet) connectivity, network printing, media management (e.g., media server), content services, streaming services, broadband services, or other network-related services. The computing device 104 may allow the user device 102 to interact with remote resources such as information associated with passwords, passphrases, facial components, visemes, and or the like. The computing device 104 may allow the user device 102 to interact with any type of data, devices, or files. The computing device may be configured as (or disposed at) a central location (e.g., a headend, or processing facility), which may receive content (e.g., data, input programming) from multiple sources. The computing device 104 may combine the content from the multiple sources and may distribute the content to user (e.g., subscriber) locations via a distribution system.

The computing device 104 may manage the communication between the user device 102 and a database 114 for sending and receiving data therebetween. As an example, the database 114 may store a plurality of files (e.g., web pages), user identifiers or records, or other information (e.g., passwords, passphrases, facial components, visemes, etc. . . . ). For example, the user device 102 may request and/or retrieve a file and/or information (e.g., passwords, passphrases, facial components, visemes, etc. . . . ) from the database 114. The database 114 may store information relating to the user device 102 such as the address element 110 and/or the service element 112. For example, the computing device 104 may obtain the device identifier 108 from the user device 102 and retrieve information from the database 114 such as the address element 110 and/or the service elements 112. As a further example, the computing device 104 may obtain the address element 110 from the user device 102 and may retrieve the service element 112 from the database 114, or vice versa. Any information (e.g., passwords, passphrases, facial components, visemes, etc. . . . ) may be stored in and retrieved from the database 114. The database 114 may be disposed remotely from the computing device 104 and accessed via direct or indirect connection. The database 114 may be integrated with the computing system 104 or some other device or system.

The user device 102 may provide/transmit the one or more images of the person's face to the computing device 104 during a communication session between the user device 102 and the computing device 104. The communication session between the user device 102 and the computing device 104 may be based on a long-range communication technique (e.g., Internet, cellular, satellite, and the like). The communication session between the user device 102 and the computing device 104 may be based on a short-range communication technique (e.g., BLUETOOTH®, near-field communication, infrared, and the like). The user device 102 may provide/transmit the one or more images of the person's face to the computing device 104 and the computing device 104 may determine an identity of the person and/or whether the person should be granted access to the user device 102.

The computing device 104 may comprise an image processing module 119. The image processing module 119 may extract facial components from the one or more images of the person's face to determine the identity of the person and/or whether the person should be granted access to the user device 102. The determination may be based, at least in part, on a match/comparison of the facial components of the person extracted from the one or more images to stored facial components (e.g., facial components of an authorized person stored in the database 114, etc. . . . ).

The match/comparison between facial components of the person extracted from the one or more images and stored facial components may be based on an error/discrepancy threshold and/or tolerance. The matching/comparison between the facial components of the person extracted from the one or more images and the stored facial components may comprise error correction and/or normalization which accounts for the error/discrepancy threshold and/or tolerance. The error correction and/or normalization may enable discriminate identification of facial components associated with the person and/or identification of the person. For example, the image processing module 119 may identify a person's face (e.g., facial components) despite external factors such as lighting, angle, and the like associated with the captured one or more images. The image processing module 119 may use fuzzy logic to identify a person's face. The image processing module 119 may identify the person's face (e.g., facial components) despite factors such as the person's emotion (e.g., mood, temperament, unique pronunciation, etc. . . . ) when providing the audible password/passphrase (or non-audible password/passphrase).

The image processing module 119 may identify the person's face (e.g., facial components) despite factors such as the person's emotion (e.g., mood, temperament, unique pronunciation, etc. . . . ) when providing the audible password/passphrase (or non-audible password/passphrase). The image processing module 119 may use reference points (e.g., facial components, etc. . . . ) from the captured one or more images to identify the person's face. For example, an image of the one or more images may comprise reference points (e.g., facial components, etc. . . . ) that correspond to reference points of another image. The image processing module 119 may match/compare the reference points associated with the image to corresponding reference points of the other image. For example, a match/comparison between reference points from the respective images may indicate that the person faces are the same (e.g., substantially the same). The match/comparison between the reference points may be based on an error/discrepancy threshold and/or tolerance. For example, each reference point may not have to match. A threshold may be satisfied if only two reference points of the image match two reference points of the other image. An image may comprise any number of reference points (e.g., facial components). The threshold may be any value and/or setting.

The image processing module 119 may extract additional information from the captured one or more images. The image processing module 119 may extract oral components (e.g., lip structures, visemes, etc. . . . ) associated with the pronunciation/articulation of the audible password/passphrase (or non-audible password/passphrase). For example, the image processing module 119 may generate/extract a sequence of images (e.g., extracted from the captured one or more images) of the person's lips when the person provides the audible password/passphrase (or non-audible password/passphrase). The image processing module 119 may generate, determine, and/or classify a sequence of visemes that correspond to the sequence of images of the person's lips when the person provides the audible password/passphrase (or non-audible password/passphrase). Each image of the sequence of images (e.g., extracted from the captured one or more images) of the person's lips may be associated with a timestamp. The timestamps may be used to correlate lip movements (e.g., visemes) associated with the audible password/passphrase (or non-audible password/passphrase) with a stored sequence of visemes (e.g., stored in the database 114, etc. . . . ) associated with an audible password/passphrase (or non-audible password/passphrase) captured/determined during a registration/enrollment process. The registration/enrollment process may be performed, for example, when the person configures security settings for the user device 102.

A time series recording (e.g., a plurality of time stamped images, etc. . . . ) of the person speaking/mouthing the audible password/passphrase (or non-audible password/passphrase) may comprise a plurality of visemes used to articulate the audible password/passphrase (or non-audible password/passphrase). The sequence of visemes (e.g., timestamps associated with the sequence of visemes, etc. . . . ) may be compared/matched to the stored sequence of visemes (e.g., timestamps associated with the stored sequence of visemes, etc. . . . ) to determine if the person's lip structure made when providing the audible password/passphrase (or non-audible password/passphrase) matches stored information (e.g., a stored password, a stored passphrase, etc. . . . ) associated with the user device and/or person. Despite factors such as tone, inflection, and other attributes of articulation, each viseme associated with each sound (e.g., phoneme) made when speaking/mouthing the audible password/passphrase (or non-audible password/passphrase) should be the same (e.g., substantially the same) each time the person speaks/provides the audible password/passphrase (or non-audible password/passphrase). The match/comparison between the sequence of visemes and the stored sequence visemes may be based on an error/discrepancy threshold and/or tolerance. The match/comparison between the sequence of visemes and the stored sequence of visemes may comprise error correction and/or normalization which accounts for the error/discrepancy threshold and/or tolerance. The error correction and/or normalization may enable discriminate identification of the sequence of visemes associated with the person and/or identification of the person.

For example, the image processing module 119 may correlate the sequence of visemes (e.g., timestamps associated with the sequence of visemes) to a stored sequence visemes (e.g., timestamps associated with the stored sequence of visemes) despite external factors such as lighting, angle, and the like associated with the captured one or more images from which the sequence of visemes are extracted/determined. The image processing module 119 may use fuzzy logic to correlate the sequence of visemes to a stored sequence of visemes. The image processing module 119 may the correlate the sequence of visemes to a stored sequence of visemes despite factors such as the person's emotion (e.g., mood, temperament, unique pronunciation, etc. . . . ) when providing the audible password/passphrase (or non-audible password/passphrase).

The image processing module 119 may correlate the sequence of visemes to the stored sequence of visemes despite factors such as the person's emotion (e.g., mood, temperament, unique pronunciation, etc. . . . ) when providing the audible password/passphrase (or non-audible password/passphrase). The image processing module 119 may use reference points (e.g., facial components, etc. . . . ) to correlate a viseme of a sequence of visemes to a viseme of a stored sequence of visemes. For example, the viseme of the sequence of visemes may comprise reference points (e.g., facial components, etc. . . . ) that correspond to reference points of the viseme of the stored sequence of visemes. The image processing module 119 may match/compare the reference points associated with the viseme of the sequence of visemes to corresponding reference points of the viseme of the stored sequence of visemes. For example, a match/comparison between reference points from the viseme of the sequence of visemes to the viseme of the stored sequence of visemes may indicate that the respective visemes are the same (e.g., substantially the same). An inability to match/compare reference points from the viseme of the sequence of visemes to the viseme of the stored sequence of visemes may indicate that the respective visemes are different. The match/comparison between the reference points may be based on an error/discrepancy threshold and/or tolerance. For example, each reference point may not have to match. A threshold may be satisfied if only two reference points of a viseme of the sequence of visemes match two reference points of a viseme of the other image. A sequence of visemes may comprise any number of reference points (e.g., facial components). The threshold may be any value and/or setting.

The computing device 104 may determine the identity of the person and/or whether the person should be granted access to the user device 102 and inform/instruct the user device 102. The computing device 104 may determine the identity of the person and/or whether the person should be granted access to the user device 102 and inform/instruct the user device 102 during the communication session between the computing device 104 and the user device 102. The user device 102 may grant the person access to the user device 102 based on the information/instruction from the computing device 104.

Figure 2:
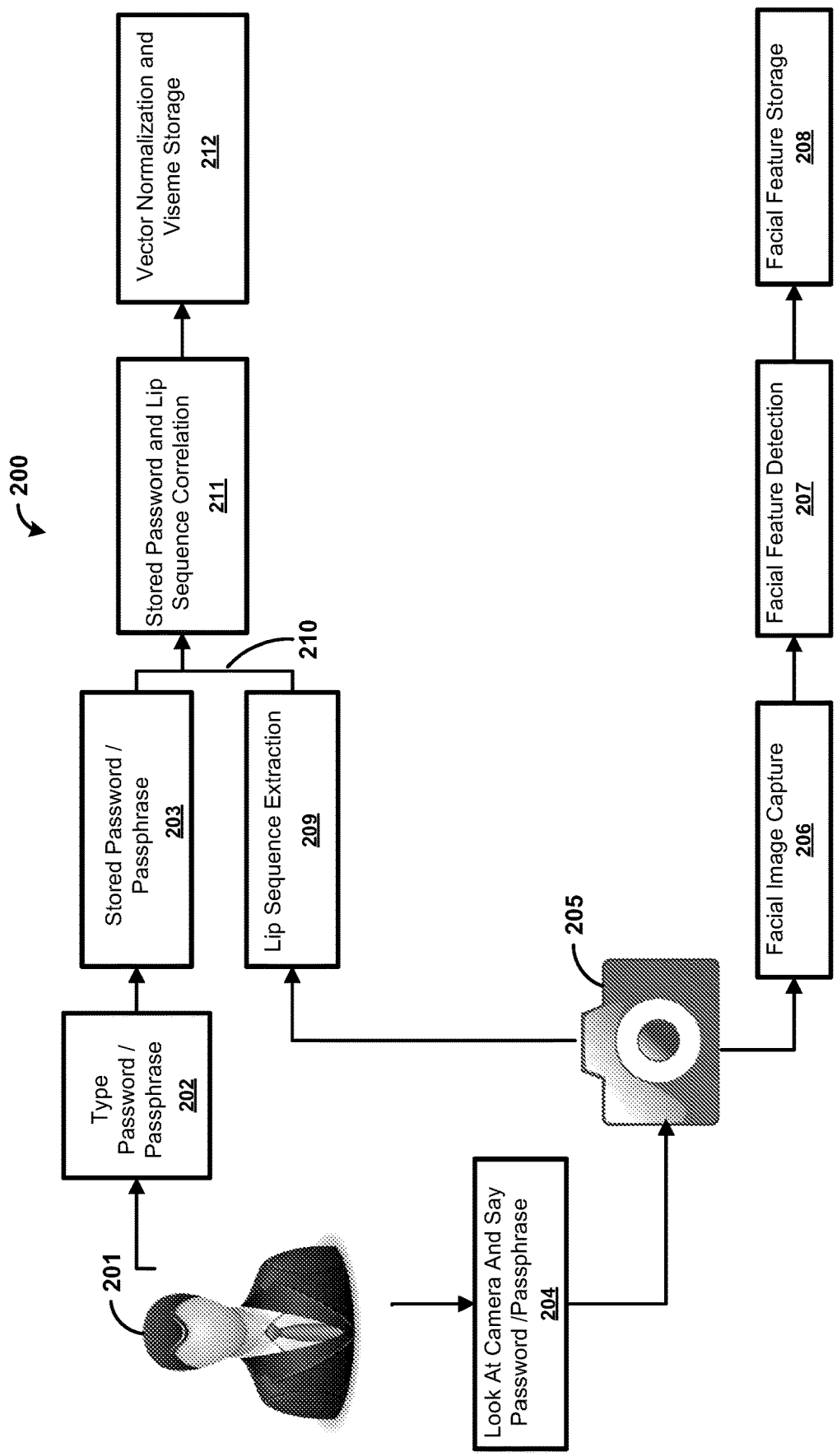
FIG. 2 shows a registration process for user authentication.

FIG. 2 is a diagram of an example process 200 for user authentication. The process 200 depicts a registration/enrollment process, such as when a user 201 configures security settings for a user device (e.g., the user device 102, a smartphone, a computer, a laptop, a tablet, etc. . . . ). During the registration/enrollment process, the user device may provide a notification, an indication, or the like to/for the user 201 to provide a password, a passphrase, or the like. For example, at 202 the user 201 may use a keyboard, a touchscreen, a touchpad, or the like configured/associated with the user device to type/input the password, the passphrase, or the like. At 203 the user device may store the password, the passphrase, or the like. At 204, the user 201 may look at the camera 205 and say/speak the password, the passphrase, or the like. The camera 205 may be configured with and/or associated with the user device.

At 206, the camera 205 may capture a sequence of images. For example, the camera 205 may capture one or more images (e.g., a sequence of images, photographs, video, etc. . . . ) of a face of the user providing the audible password/passphrase (or non-audible password/passphrase). At 207, the user device may process the one or more images of the face. The user device may extract facial components of the user from the one or more images of the user's face. Facial components may comprise precise measurements and/or descriptions associated with a user's face such as the user's nose, eyes, lips, ears, distinguishing marks (e.g., moles, birthmarks, blemishes, tattoos, etc. . . . ), facial dimensions, reference points, and the like. At 208, the extracted facial components may be stored (e.g., stored in the storage module 106, stored in the database 114, etc. . . . ).

At 209, a lip sequence (e.g., a sequence of lip movements, etc. . . . ) may be extracted from the one or more images (e.g., a sequence of images, photographs, video, etc. . . . ) of the face of the user saying/speaking the password, the passphrase, or the like.

A first image of the one or more images may be used to determine a plurality of points of interest (POIs) associated with a user's lips as the user says/speaks the password, the passphrase, or the like. POIs associated with a viseme or plurality of visemes may be determined. For example, POIs associated with a left lip corner (LLC), a right lip corner (RLC), a lower lip (LL), an upper lip (UL), or the like may be determined from the user's lips as the lips form a viseme. Distances between the POIs may be determined. For example, a horizontal distance (DH) between the left lip corner (LLC) and the right lip corner (RLC) may be determined, and/or a vertical distance (DV) between the lower lip (LL) and the upper lip (UL) may be determined. Further, a region of interest (ROI) associated with the user he user saying/speaking the password, the passphrase, or the like may be determined. For example, an area (DA) inside the user's mouth may be determined as a ROI. The POIs and ROI for each image of the one or more images may be determined/tracked.

At 210, the lip sequence may be correlated/associated with the stored password, stored passphrase, or the like. At 211, the lip sequence may be correlated/associated with the stored password, stored passphrase, or the like to train the user device and/or cause the user device to determine all possible visemes matching/associated with the password, the passphrase, or the like.

A plurality of vectors may be determined that are associated with the distances, POIs, and/or ROI determined for each image (e.g., viseme) of the one or more images (e.g., plurality of viseme, etc. . . . ). For example, a vector (e.g., DH) may be associated with the distance (e.g., horizontal distance, etc. . . . ) between the left lip corner (LLC) and the right lip corner (RLC), and/or a vector (e.g., DV) may be associated with the distance (e.g., vertical distance, etc. . . . ) between the lower lip (LL) and the upper lip (UL). A vertical vector ($V_{Dv}$) may be determined for the vertical distance (DV) between the lower lip (LL) and the upper lip (UL), a horizontal vector ($V_{DH}$) may be determined for the horizontal distance (DH) between the left lip corner (LLC) and the right lip corner (RLC), and an area vector ($V_{DA}$) may be determined for the region of interest (DA) between the user's lips for each image of the one or more images.

At 212, the user device may store some or all possible visemes matching/associated with the password, the passphrase, or the like. The plurality of vectors may be stored in a temporal order (e.g., an order in which they occur in the one or more images, etc. . . . ). The plurality of vectors may be used to determine normalized vectors. For example, a maximum number of each type of vector (e.g., $V_{DH}$, $V_{DV}$, $V_{DA}$, etc. . . . ) determined from the sequence of images may be used to normalize each vector of the plurality of vectors. The normalized vectors (e.g., $V_{ONDH}$, $V_{ONDV}$, $V_{ONDA}$, etc. . . . ) may be stored during a registration/enrollment process. The normalized vectors may be used as reference vectors for subsequent analysis of a user saying/speaking the password, the passphrase, or the like. For example, a user saying/speaking the password, the passphrase, or the like, subsequent to the registration/enrollment process, may be processed in the manner described. A new set of normalized vectors (e.g., $V_{NDH}$, $V_{NDV}$, $V_{NDA}$, etc. . . . ) may be determined from the user saying/speaking the password, the passphrase, or the like. The new normalized vectors (e.g., $V_{NDH}$, $V_{NDV}$, $V_{NDA}$, etc. . . . ) may be compared to the original normalized vectors (e.g., $V_{ONDH}$, $V_{ONDV}$, $V_{ONDA}$, etc. . . . ) determined from the registration/enrollment process. If distances associated with the new vectors and the respective original vectors are within a threshold, then the user articulating the audible password/passphrase (or non-audible password/passphrase) may be confirmed as the original user that said/spoke the password, the passphrase, or the like during the registration/enrollment process.

The registration/enrollment process 200 configures the user device with security settings (e.g., password registration/requirement, facial recognition, viseme recognition, etc. . . . ). The security settings enable user authentication, such as user authentication via password verification, facial recognition, viseme recognition, vector comparison, and the like, whenever a user desires to gain access to the user device and/or information associated/configured with the user device.

Figure 3:
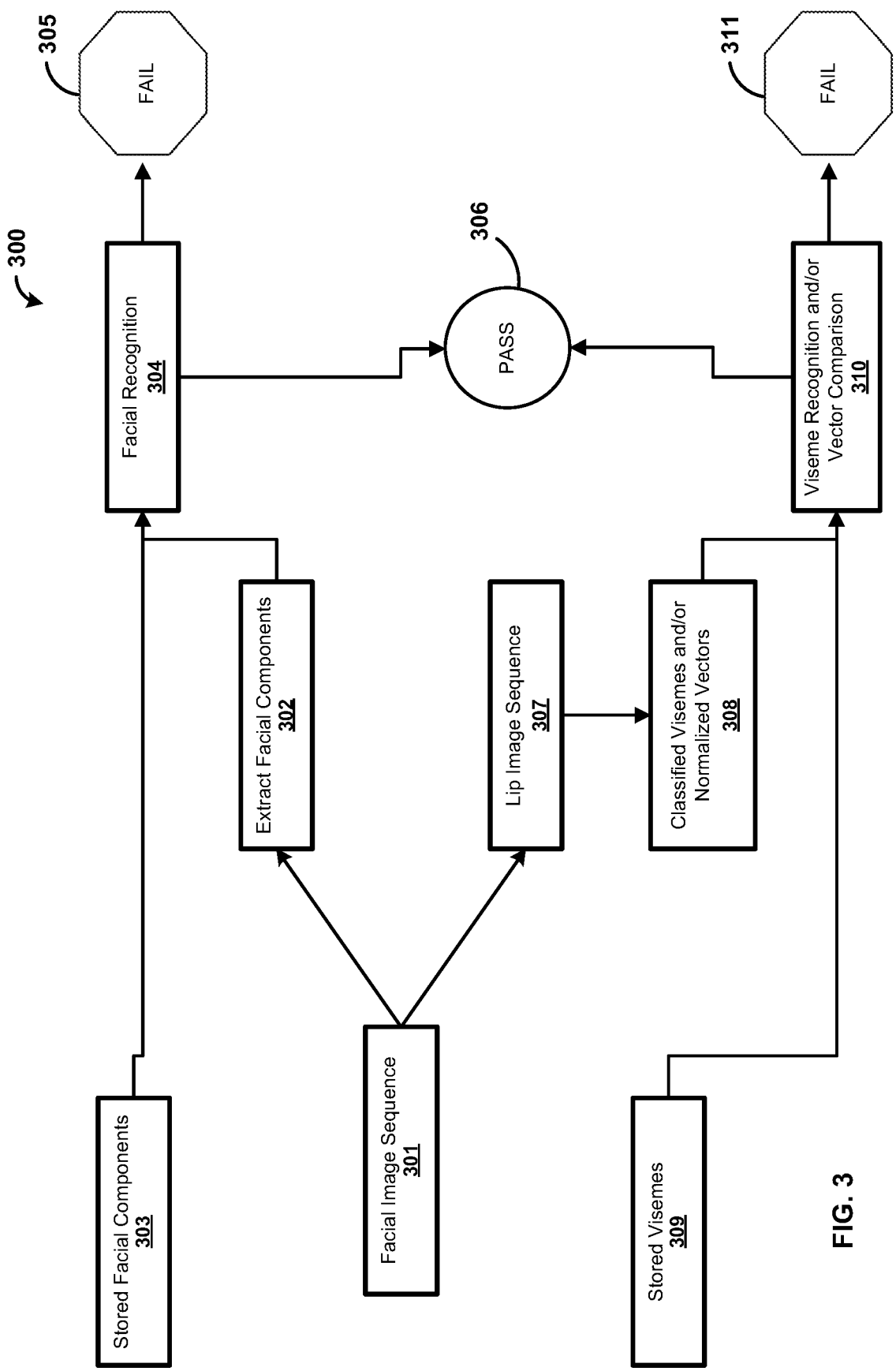
FIG. 3 shows a process for user authentication.

FIG. 3 is a diagram of an example process 300 for user authentication. When a user attempts to gain access to (e.g., login, etc. . . . ) a user device (e.g., the user device 102, a smartphone, a computer, a laptop, a tablet, etc. . . . ), the user device may provide a notification, an indication, or the like to/for the user to provide a password, a passphrase, or the like before access to the user device is granted. The notification, the indication, or the like may request/instruct the user to look into a camera configured/associated with the user device and say/speak a password, a passphrase, or the like. At 301, when the user says/speaks the password, the passphrase, or the like, the user device (e.g., via the camera) may capture/generate a sequence of facial images (e.g., one or more images of the user's face while saying the password). At 302, the user device may process the sequence of facial images. The user device may extract facial components of the user from the sequence of facial images. Facial components may comprise precise measurements and/or descriptions associated with a user's face such as the user's nose, eyes, lips, ears, distinguishing marks (e.g., moles, birthmarks, blemishes, tattoos, etc. . . . ), facial dimensions, reference points, and the like. Extracted facial components may be stored.

At 303, the user device may retrieve stored facial components. The stored facial components may be associated with one or more users. The stored facial components may be stored during a registration/enrollment process (e.g., the process 200, etc. . . . ). The registration/enrollment process may be performed, for example, when a user configures security settings for the user device. At 304, the user device may perform facial recognition to determine an identity of a user and/or whether the user should be granted access to the user device (e.g., whether the user is authorized to use the user device, etc. . . . ). The user device may determine if the user should be granted access to the user device based, at least in part, on a match/comparison of the extracted facial components (302) to the stored facial components (303). The match/comparison between the extracted facial components (302) and the stored facial components (303) may be based on an error/discrepancy threshold and/or tolerance. The matching/comparison between the extracted facial components (302) and the stored facial components (303) may comprise error correction and/or normalization which accounts for the error/discrepancy threshold and/or tolerance. The error correction and/or normalization may enable discriminate identification of facial components associated with the user and/or identification of the user. For example, the user device may identify a user's face (e.g., facial components) despite external factors such as lighting, angle, and the like associated with the facial image sequence (301). The user device may use fuzzy logic to identify a user's face (e.g., facial components). The user device may identify the user's face despite factors such as the user's emotion (e.g., mood, temperament, unique pronunciation, etc. . . . ) when providing the password, the passphrase, or the like.

If the user device is unable to match the extracted facial components (302) with the stored facial components (303), at 305, user authentication may fail. If the user authentication fails (305), the user may be denied access to the user device and/or information associated with the user device. If the user device is able to match the extracted facial components (302) with the stored facial components (303), at 306, user authentication may pass. If the user authentication passes (306), the user may be granted/allowed access to the user device and/or information associated with the user device.

The user device may use and/or require additional user authentication to grant/deny access to the user device and/or information associated with the user device. At 307, the user device may determine a lip image sequence. The user device may determine the lip sequence from the sequence of facial images (e.g., one or more images of the user's face while saying the password). A lip image sequence may be generated/created that comprises a plurality of images of the user's lips captured from the user saying/speaking the password, the passphrase, or the like.

At 308, each image of the user's lips from the lip image sequence may be classified as a viseme. Each viseme determined from the lip image sequence may be associated with a timestamp.

A first facial image of the sequence of facial images may be used to determine a plurality of points of interest (POIs) associated with a user's lips as the user says/speaks the password, the passphrase, or the like. POIs associated with a viseme or plurality of visemes may be determined. For example, POIs associated with a left lip corner (LLC), a right lip corner (RLC), a lower lip (LL), an upper lip (UL), or the like may be determined from the user's lips as the lips form a viseme. Distances between the POIs may be determined. For example, a horizontal distance (DH) between the left lip corner (LLC) and the right lip corner (RLC) may be determined, and/or a vertical distance (DV) between the lower lip (LL) and the upper lip (UL) may be determined.

Further, a region of interest (ROI) associated with the user he user saying/speaking the password, the passphrase, or the like may be determined. For example, an area (DA) inside the user's mouth may be determined as a ROI. The POIs and ROI for each image of the one or more images may be determined/tracked. A plurality of vectors may be determined that are associated with the distances, POIs, and/or ROI determined for each image (e.g., viseme) of the one or more images (e.g., plurality of viseme, etc. . . . ). For example, a vector (e.g., DH) may be associated with the distance (e.g., horizontal distance, etc. . . . ) between the left lip corner (LLC) and the right lip corner (RLC), and/or a vector (e.g., DV) may be associated with the distance (e.g., vertical distance, etc. . . . ) between the lower lip (LL) and the upper lip (UL). A vertical vector ($V_{DV}$) may be determined for the vertical distance (DV) between the lower lip (LL) and the upper lip (UL), a horizontal vector ($V_{DH}$) may be determined for the horizontal distance (DH) between the left lip corner (LLC) and the right lip corner (RLC), and an area vector ($V_{DA}$) may be determined for the region of interest (DA) between the user's lips for each image of the one or more images. A plurality of vectors may be stored in a temporal order (e.g., an order in which they occur in the one or more images, etc. . . . ). The plurality of vectors may be used to determine normalized vectors. For example, a maximum number of each type of vector (e.g., $V_{DH}$, $V_{DV}$, $V_{DA}$, etc. . . . ) determined from the sequence of images may be used to normalize each vector of the plurality of vectors. The normalized vectors (e.g., $V_{ONDH}$, $V_{ONDV}$, $V_{ONDA}$, etc. . . . ) may be stored during a registration/enrollment process. The registration/enrollment process may be performed, for example, when a user configures security settings for the user device. The normalized vectors may be used as reference vectors for subsequent analysis of a user saying/speaking the password, the passphrase, or the like.

At 309, the user device may retrieve stored visemes. The stored visemes may be associated with one or more users. The stored visemes may be stored during a registration/enrollment process (e.g., the process 200, etc. . . . ). The plurality of vectors stored during the registration/enrollment process may be retrieved. A user saying/speaking the password, the passphrase, or the like, subsequent to the registration/enrollment process, may be processed in the manner described. A new set of normalized vectors (e.g., $V_{NDH}$, $V_{NDV}$, $V_{NDA}$, etc. . . . ) may be determined from the user saying/speaking the password, the passphrase, or the like.

At 310, the user device may perform viseme recognition to determine an identity of the user and/or whether the user should be granted access to the user device (e.g., whether the user is authorized to use the user device, etc. . . . ). The user device may determine if the user should be granted access to the user device based, at least in part, by correlating the timestamps associated with classified visemes (308) (e.g., correlating each viseme associated with the lip image sequence (307)) with timestamps associated with the stored sequence of visemes (309).

The classified visemes (308) may be compared/matched to the stored sequence of visemes (309) to determine if the user's lip structure made when providing the password, the passphrase, or the like matches stored information (e.g., a stored password, a stored passphrase, etc. . . . ) associated with the user device and/or user. Despite factors such as tone, inflection, and other attributes of articulation, each viseme associated with each sound (e.g., phoneme) made when speaking the password, the passphrase, or the like should be the same (e.g., substantially the same) each time the user speaks/provides the password, the passphrase, or the like. A match/comparison between the classified visemes (308) and the stored sequence of visemes (309) may be based on an error/discrepancy threshold and/or tolerance. The match/comparison between the classified visemes (308) and the stored sequence of visemes (309) may comprise error correction and/or normalization which accounts for the error/discrepancy threshold and/or tolerance. The error correction and/or normalization may enable discriminate identification of a sequence of visemes associated with the user and/or identification of the user. The user device may use fuzzy logic to correlate the classified visemes (308) (e.g., timestamps associated with the visemes associated with the lip image sequence (307)) to the stored sequence of visemes (309) (e.g., timestamps associated with the stored sequence of visemes (309)). The user device may correlate the classified visemes (308) to the stored sequence of visemes (309) despite external factors such as lighting, angle, and the like associated with the lip image sequence (307). The user device may correlate the classified visemes (308) to the stored sequence of visemes (309) despite factors such as the user's emotion (e.g., mood, temperament, unique pronunciation, etc. . . . ) when providing the audible password/passphrase (or non-audible password/passphrase).

If the user device is unable to correlate/match the classified visemes (308) to the stored sequence of visemes (309), at 311, user authentication may fail. New normalized vectors (e.g., $V_{NDH}$, $V_{NDV}$, $V_{NDA}$, etc. . . . ) may be compared to the original normalized vectors (e.g., $V_{ONDH}$, $V_{ONDV}$, $V_{ONDA}$, etc. . . . ) determined/stored during the registration/enrollment process. If distances associated with the new vectors and the respective original vectors do not satisfy a threshold (e.g., are not within the threshold, etc. . . . ), at 311, user authentication may fail.

If the user authentication fails (311), the user may be denied access to the user device and/or information associated with the user device. If the user device is able to correlate/match the classified visemes (308) to the stored sequence of visemes (309), at 306, user authentication may pass. If distances associated with the new vectors and the respective original vectors satisfy a threshold, at 306, user authentication may pass. If the user authentication passes (306), the user may be granted/allowed access to the user device and/or information associated with the user device.

The process 300 comprises the use of customized data (e.g., viseme recognition, vector determination, etc. . . . ) and biometric data (e.g., facial components, facial recognition, etc. . . . ) for user authentication. The process 300, as described, protects a user from involuntary authentication, stolen face issues (e.g., facial recognition through the use of an unauthorized image of an authorized user, etc. . . . ), user discrepancy and distinction identification (e.g., determine an authorized user among twins or individuals with similar appearances, etc. . . . ). The use of normalized vectors and/or stored visemes enables recognition of a password/phrase spoken by user despite the user's mood, articulation, or temperament. A match between vectors associated with POIs and/or ROIs may avoid complexity associated with translating lip movements to actual words and supports passwords spoken in any language.

Figure 4:
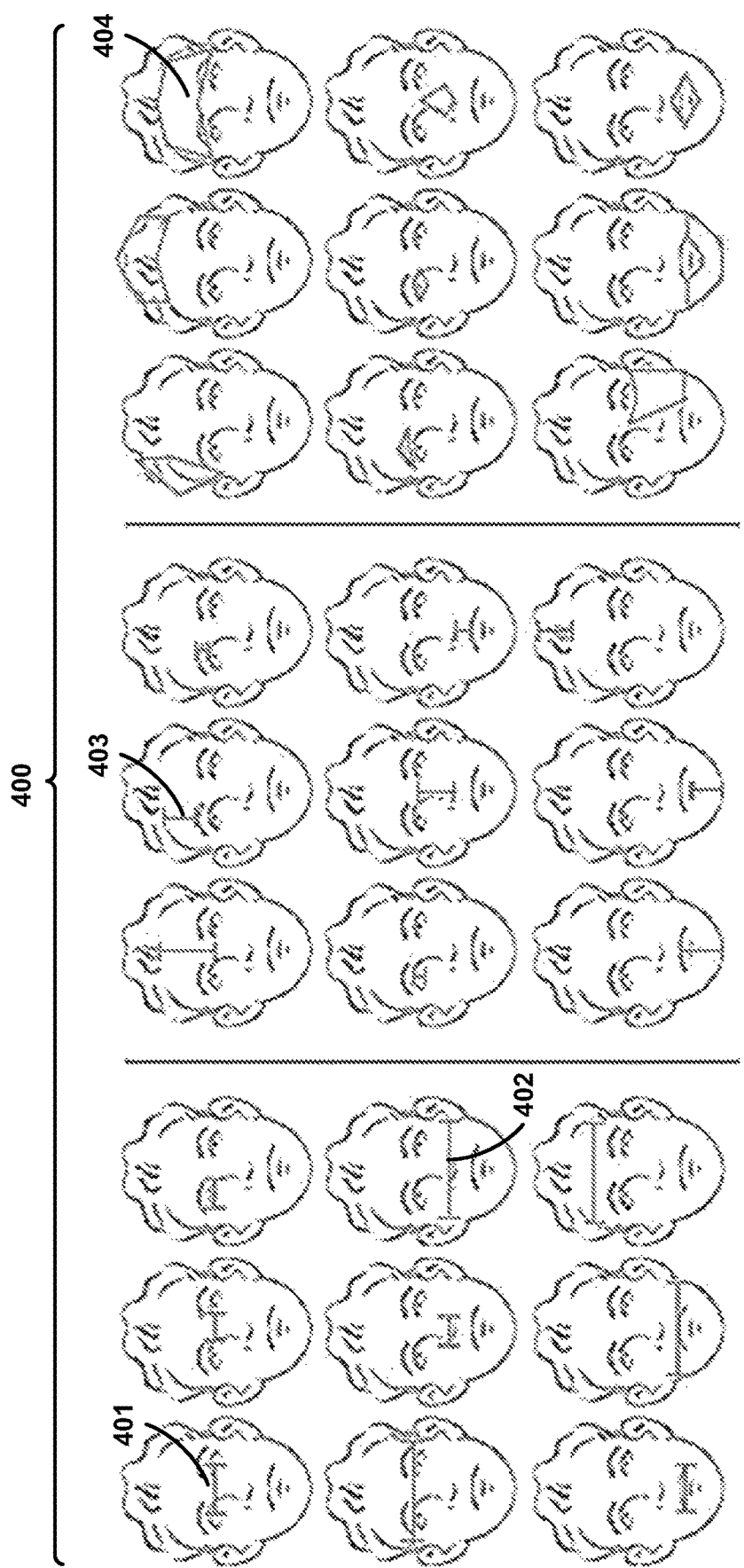
FIG. 4 shows example facial components for user authentication.

FIG. 4 is a diagram of facial components. When a user attempts to gain access to (e.g., login, etc. . . . ) a user device (e.g., the user device 102, a smartphone, a computer, a laptop, a tablet, etc. . . . ), the user device may provide a notification, an indication, or the like to/for the user to provide a password, a passphrase, or the like before access to the user device is granted. The notification, the indication, or the like may request/instruct the user to look into a camera configured/associated with the user device and say/speak a password, a passphrase, or the like. When the user says/speaks the password, the passphrase, or the like, the user device (e.g., via the camera) may capture/generate a sequence of facial images 400. The user device may extract facial components of the user from the sequence of facial images 400. Facial components may comprise precise measurements and/or descriptions associated with a user's face such as the user's nose, eyes, lips, ears, distinguishing marks (e.g., moles, birthmarks, blemishes, tattoos, etc. . . . ), facial dimensions, reference points, and the like. For example, facial component 401 may be a measurement of length between the user's eyes. Facial component 402 may be a measurement of length between the user's ears. Facial component 403 may be a measurement of length between the user's eyebrow and hairline. Facial component 402 may be a measurement of area of the user's forehead. Any facial component may be determined/extracted. Extracted facial components may be stored (e.g., stored in the storage module 106, stored in the database 114, etc. . . . ).

Figure 5:
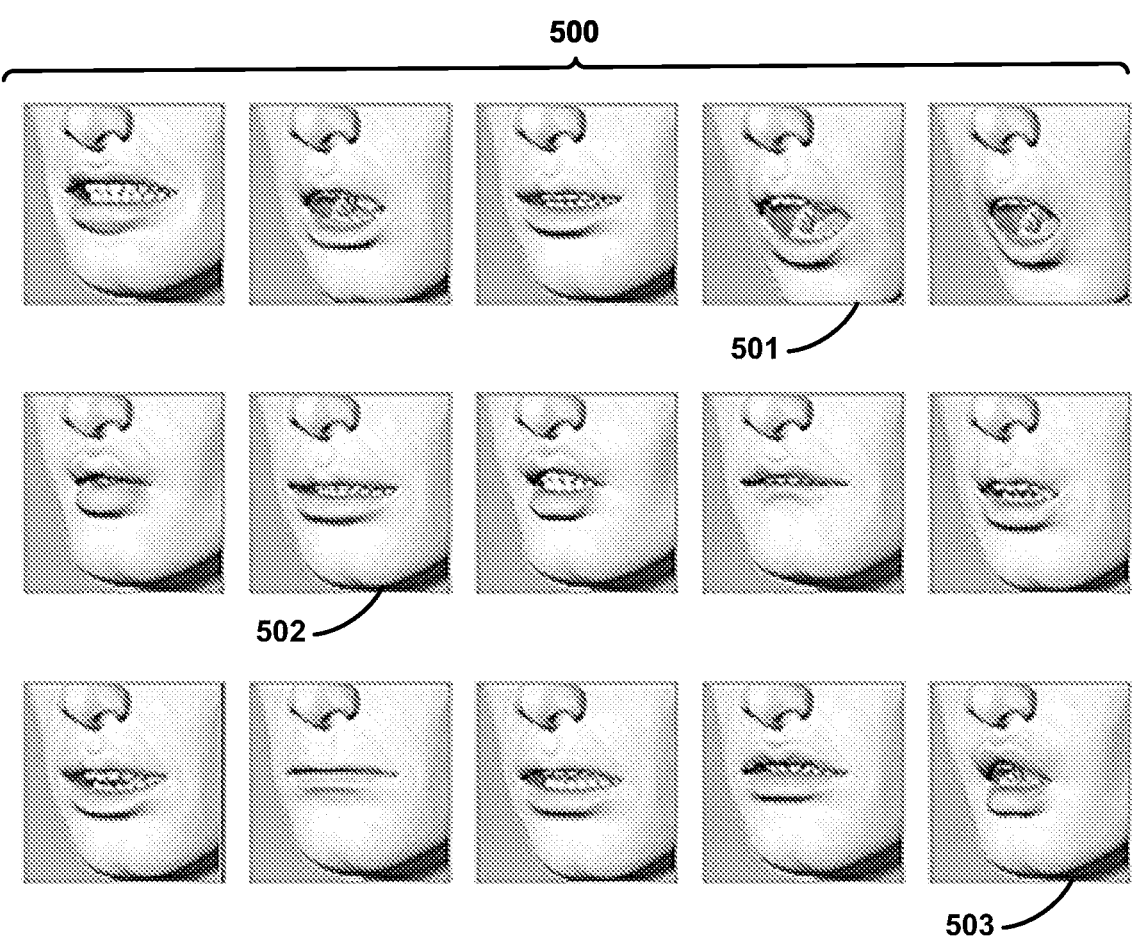
FIG. 5 shows example visemes.

FIG. 5 is a diagram of visemes 500. A user device (e.g., the user device 102, etc. . . . ) may determine a lip image sequence from one or more images of a user saying/speaking a password, a passphrase, or the like. The lip image sequence may comprise any one of the visemes 500. For example viseme 501 may be extracted from an image and associated with a user making an "ah" sound when saying/speaking the password, the passphrase, or the like. Viseme 502 may be extracted from an image and associated with a user making a "s," or "z" sound when saying/speaking the password, the passphrase, or the like. Viseme 503 may be extracted from an image and associated with a user making an "r" sound when saying/speaking the password, the passphrase, or the like. Any type and/or number of viseme may be determined and/or stored by a device (e.g., user device 102, computing device 104, etc. . . . ).

Figure 6:
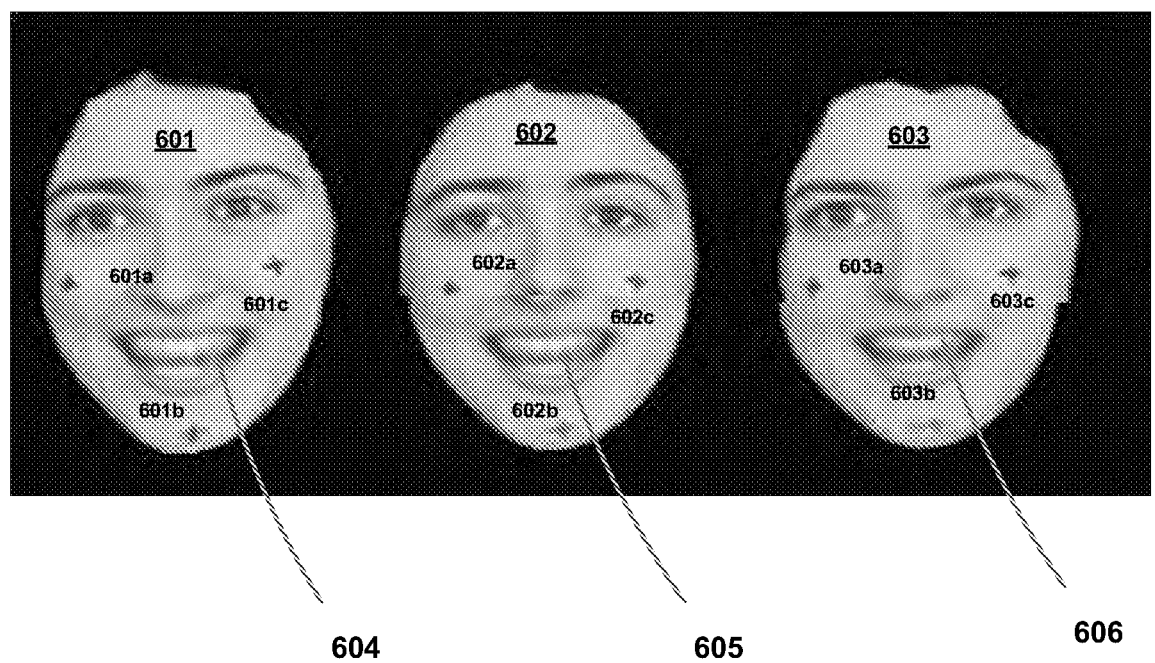
FIG. 6 shows example visemes.

FIG. 6 is a diagram of visemes associated with a user saying/speaking a portion of a password, a passphrase, or the like. Image 601, image 602, and image 603 are images from different lip image sequences (e.g., the lip sequence at 209, the lip image sequence (307), etc. . . . ) of a user saying/speaking, at least a portion of the password, the passphrase, or the like. Notably, each image (e.g., image 601, image 602, and image 603) is of the user saying/speaking, at least a portion of the same password, passphrase, or the like, but with a different emotion (e.g., mood, temperament, unique pronunciation, etc. . . . ) expressed. For example, image 601 is an image of the user saying/speaking, at least a portion of the same password, passphrase, or the like, with a happy emotion or disposition. The image 601 is of the user saying/speaking, at least a portion of the same password, passphrase, or the like with a happy emotion or disposition. The image 601 may be a stored image of the user saying/speaking, at least a portion of the password, the passphrase, or the like during a registration/enrollment process (e.g., the process 200, etc. . . . ). The registration/enrollment process may be performed, for example, when a user configures security settings for a user device (e.g., the user device 102, a smartphone, a computer, a laptop, a tablet, etc. . . . ).

Image 602 is an image of the user saying/speaking, at least a portion of the same password, passphrase, or the like, with a solemn emotion or disposition. Image 603 is of the user saying/speaking, at least a portion of the same password, passphrase, or the like, with an angry and/or intense emotion or disposition. Notably, the viseme 604, viseme 605, and viseme 606 each may feature the same (e.g., substantially the same) viseme depiction, despite the user's emotion (e.g., mood, temperament, unique pronunciation, etc. . . . ) when saying/speaking the password, the passphrase, or the like. The image 601, the image 602, and the image 603 may each comprise facial components that may be used as reference points. For example, the image 601 may comprise the reference points (e.g., facial components, etc. . . . ) 601a, 601b, 601c, image 602 may comprise the reference points 602a, 602b, 602c, and image 603 may comprise the reference points 603a, 603b, 603c. To determine that the viseme 604, viseme 605, and viseme 606 each feature the same (e.g., substantially the same) viseme depiction, the user device may match/compare the reference points (e.g., facial components, etc. . . . ) associated with each image to corresponding reference points of other respective images. For example, a match/comparison between reference points 601a, 601b, 601c to reference points 602a, 602b, 602c may indicate that the visemes 604 and 605 are the same (e.g., substantially the same). The match/comparison between the reference points 601a, 601b, 601c and the reference points 602a, 602b, 602c may be based on an error/discrepancy threshold and/or tolerance. For example, each reference point 601a, 601b, 601c may not have to match reference points 602a, 602b, 602c. A threshold may be satisfied if only two reference points of image 601 (viseme 604), such as 601a and 601b, match two reference points of image 602 (viseme 605), such as 602a and 602b. An image may comprise any number of reference points (e.g., facial components). The threshold may be any value and/or setting. A match/comparison between the reference points may comprise error correction and/or normalization which accounts for the threshold and/or a tolerance. The error correction and/or normalization may enable discriminate identification of any number of visemes (e.g., 604, 605, 606, etc. . . . ) associated with a user and/or identification of the user.

Figure 7:
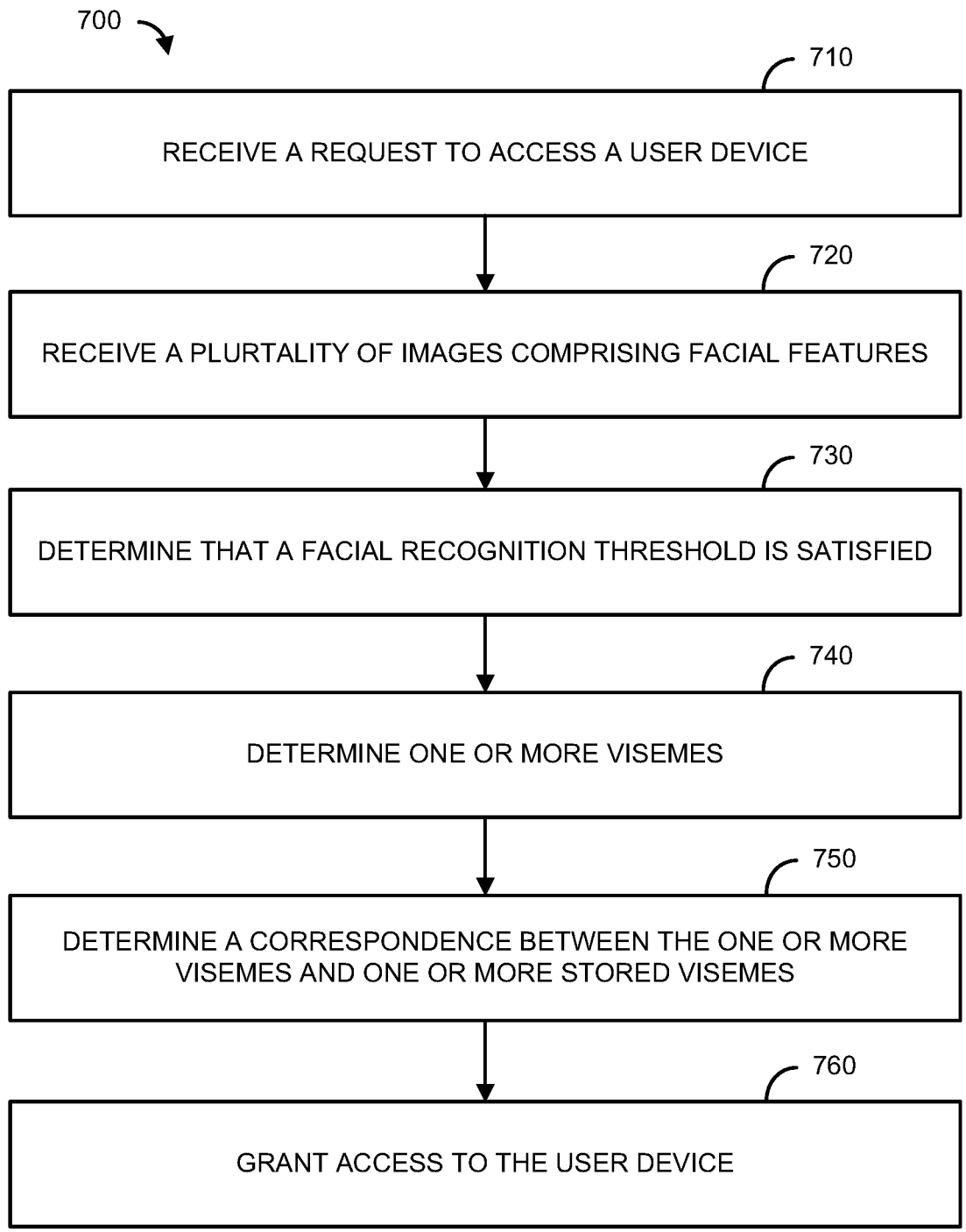
FIG. 7 is a flowchart of an example method for user authentication.

FIG. 7 is a flowchart of an example method 700 for user authentication. At 710, a request to access a user device can be received. For example, a request may be received from a user attempting to access a user device. The user device (e.g., the user device 102, a smartphone, a computer, a laptop, a tablet, etc. . . . ) may receive the request for access. The user device may receive the request for access from a user attempting to cause to the user device to unlock from a locked state and/or access information associated with the user device. The user device may detect and/or determine that the user is attempting to access the user device and the user device may provide a notification, an indication, or the like to/for the user to provide a password, a passphrase, or the like before access to the user device is granted.

The user device may comprise an interface that the user may use to provide/input a password, a passphrase, or the like. For example, the user may use a keyboard, touchscreen, touchpad, or the like to type/input the password, the passphrase, or the like. The user device may detect/receive an audible version of the password, the passphrase, or the like via a microphone (e.g., a sensor, a voice capturing component, etc. . . . ) configured/associated with the user device. The user device may use natural language and/or speech-to-text processing to convert the audible password (or audible passphrase) to text and/or data indicative of the audible password (or audible passphrase) that may be processed further.

The text and/or data indicative of the audible password (or audible passphrase) may be processed further to determine whether the text and/or data indicative of the audible password (or audible passphrase) matches the password, the passphrase, or the like typed/input by the user. The text and/or data indicative of the audible password (or audible passphrase) may be processed further to determine whether the text and/or data indicative of the audible password (or audible passphrase) matches stored information (e.g., a stored password, a stored passphrase, etc. . . . ) associated with the user device and/or user.

At 720, a plurality of images of the user may be received and/or determined. For example, the user device may comprise a camera (e.g., an image capturing device, etc. . . . ). The camera may capture one or more images (e.g., photographs, video, etc. . . . ) of a face of the user providing/speaking the password, the passphrase, or the like. The plurality of images may comprise a plurality of facial features of the user. The user device may determine the plurality of facial features. Facial features/components of the user may be extracted from the one or more images of the user's face. Facial features/components may comprise precise measurements and/or descriptions associated with a user's face such as the user's nose, eyes, lips, ears, distinguishing marks (e.g., moles, birthmarks, blemishes, tattoos, etc. . . . ), facial dimensions, reference points of analysis, and the like. The user device may store the extracted facial features/components in storage (e.g., the storage module 106, the database 114, etc. . . . ). For example, one or more images of a user (e.g., images capturing the user's face) and/or extracted facial features/components may be stored for authentication purposes during (as part of) a registration/enrollment process (e.g., process 200, etc. . . . ). The registration/enrollment process may be performed, for example, when the user configures security settings for the user device.

At 730, a facial recognition threshold may be satisfied. For example, a match and/or correspondence between the one or more facial features/components and one or more stored facial features/components of the user may be determined. The user device may determine the match/correspondence between the one or more facial features/components and one or more stored facial features/components of the user. The user device may use reference points (e.g., facial components, etc. . . . ) from the captured one or more images to identify the user's face. For example, an image of the one or more images may comprise reference points (e.g., facial components, etc. . . . ) that correspond to reference points of another image. The user device may match/compare the reference points associated with the image to corresponding reference points of the other image. For example, a match/comparison between reference points from the respective images may indicate that the user faces are the same (e.g., substantially the same). The match/comparison between the reference points may be based on an error/discrepancy threshold and/or tolerance. For example, each reference point may not have to match. A first threshold may be satisfied if only two reference points of the image match two reference points of the other image. An image may comprise any number of reference points (e.g., facial components). The first threshold may be any value and/or setting. The user device may identify the user's face (e.g., facial components associated with the user's face, etc. . . . ) despite factors such as the user's emotion (e.g., mood, temperament, unique pronunciation, etc. . . . ) when providing the password, the passphrase, or the like. If the user device is unable to match the extracted facial features/components with the stored facial features/components, user authentication may fail. If the user authentication fails, the user may be denied access to the user device and/or information associated with the user device. If the user device is able to match the extracted facial features/components with the stored facial features/ components, at least a portion of user authentication may pass. If the portion of user authentication passes, the user device may perform further analysis of the one or more captured images.

At 740, it may be determined that one or more facial features of the plurality of facial features comprise one or more visemes. The user device may determine the one or more visemes. The user device may determine the one or more visemes from the one or more captured images comprising the plurality of facial features. For example, the user device may generate/extract a sequence of images (e.g., extracted from the captured one or more images) of the user's lips when the user provides the password, the passphrase, or the like. The user device may generate, determine, and/or classify the one or more visemes corresponding to the sequence of images of the user's lips when the user provides the password, the passphrase, or the like. For example, each image of the sequence of images (e.g., extracted from the captured one or more images) of the user's lips may be associated with a timestamp. The timestamps may be used to correlate the one or more visemes with one or more stored visemes (e.g., stored in the storage module 106, stored in the database 114, etc. . . . ). The one or more stored visemes may be associated with a stored password, a stored passphrase, or the like that is stored during a registration/enrollment process (e.g., process 200, etc. . . . ). The registration/enrollment process may be performed, for example, when the user configures security settings for the user device.

At 750, a correspondence (match) between the one or more visemes and one or more stored visemes can be determined. The user device may determine the correspondence/match between the one or more visemes and the one or more stored visemes. A time series recording (e.g., a plurality of time stamped images, etc. . . . ) of the user speaking the password, the passphrase, or the like may comprise the one or more visemes. The one or more visemes may be used to articulate the password, the passphrase, or the like. The one or more visemes (e.g., timestamps associated with the one or more visemes, etc. . . . ) may be compared/matched to the one or more stored visemes (e.g., timestamps associated with the one or more stored visemes, etc. . . . ) to determine if the user's lip structure determined when the user provides the password, the passphrase, or the like, matches stored information (e.g., a stored password, a stored passphrase, etc. . . . ) associated with the one or more stored visemes. Despite factors such as tone, inflection, and other attributes of articulation, each viseme associated with each sound (e.g., phoneme) made when speaking a password, a passphrase, or the like should be the same (e.g., substantially the same) each time the user speaks/provides the password, the passphrase, or the like. The match/comparison between the one or more visemes and the one or more stored visemes may be based on an error/discrepancy threshold and/or tolerance. The match/comparison between the one or more visemes and the one or more stored visemes may comprise error correction and/or normalization which accounts for the error/discrepancy threshold and/or tolerance. The error correction and/or normalization may enable discriminate identification of the one or more visemes. For example, the user device may correlate the one or more visemes (e.g., timestamps associated with the one or more visemes, etc. . . . ) to the one or more stored visemes (e.g., timestamps associated with the one or more stored visemes, etc. . . . ) despite external factors such as lighting, angle, and the like associated with the captured one or more images from which the one or more visemes and/or the one or more stored visemes are extracted/determined. The user device may use fuzzy logic to correlate the one or more visemes to the one or more stored visemes.

The user device may determine that the match between the one or more visemes and the one or more stored visemes satisfies a second threshold. For example, the user device may correlate the one or more visemes to the one or more stored visemes despite factors such as the user's emotion (e.g., mood, temperament, unique pronunciation, etc. . . . ) when providing the password, the passphrase, or the like used to determine the one or more visemes and/or the one or more stored visemes. The user device may use reference points (e.g., facial components, etc. . . . ) to correlate a viseme of the one or more visemes to a viseme of the one or more stored visemes. For example, the viseme of one or more visemes may comprise reference points (e.g., facial components, etc. . . . ) that correspond to reference points of the viseme of the one or more stored visemes. The user device may match/compare the reference points associated with the viseme of the one or more visemes to corresponding reference points of the viseme of one or more stored visemes. A match/comparison between reference points from the viseme of the one or more visemes to the one or more stored visemes may indicate that the respective visemes are the same (e.g., substantially the same). An inability to match/compare reference points from the viseme of the one or more visemes to the viseme of the one or more stored visemes may indicate that the respective visemes are different. The match/comparison between the reference points may be based on an error/discrepancy threshold (e.g., second threshold, etc. . . . ) and/or tolerance. For example, each reference point may not have to match. The second threshold may be satisfied if only two reference points of a viseme of the one or more visemes match two reference points of a viseme of the one or more stored visemes. A sequence of visemes may comprise any number of reference points (e.g., facial components). The threshold may be any value and/or setting.

At 760, access may be granted to the user device. The user device may grant the user access to the user device and/or information associated with the user device. Access to the user device may comprise the user device transitioning from a locked state to an unlocked state. Access to the user device may be based on the facial recognition threshold being satisfied and the correspondence/match between the one or more visemes and the one or more stored visemes. Access to the user device may be based on satisfaction of any number of thresholds.

Figure 8:
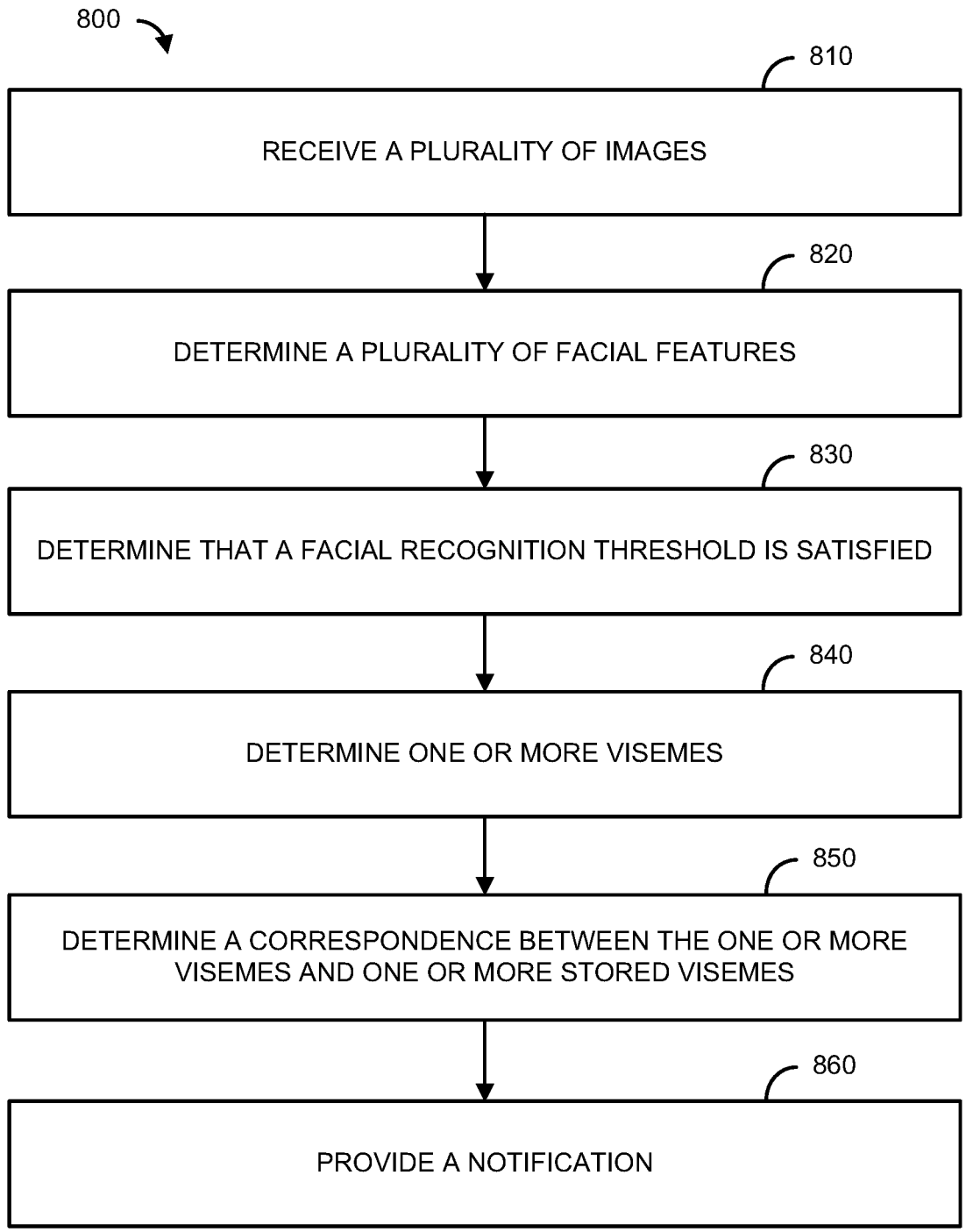
FIG. 8 is a flowchart of an example method for user authentication.

FIG. 8 is a flowchart of an example method 800 for user authentication. At 810, a plurality of images may be received. A computing device (e.g., the computing device 104, a server, a cloud-based device, etc. . . . ) may receive the plurality of images from a user device (e.g., the user device 102, a smartphone, a computer, a laptop, a tablet, etc. . . . ). For example, the user device may receive a request from a user to access the user device. The user device may receive the request for access from a user attempting to cause to the user device to unlock from a locked state and/or access information associated with the user device. The user device may detect and/or determine that the user is attempting to access the user device and the user device may provide a notification, an indication, or the like to/for the user to provide a password, a passphrase, or the like before access to the user device is granted. The user device may comprise a camera (e.g., an image capturing device, etc. . . . ).

The camera may capture the plurality of images (e.g., photographs, video, etc. . . . ) of a face of the user providing/speaking a password, a passphrase, or the like. The user device may provide the plurality of images to the computing device during a communication session between the computing device and the user device. The communication session may be based on a long-range communication technique (e.g., Internet, cellular, satellite, and the like). The communication session may be based on a short-range communication technique (e.g., BLUETOOTH®, near-field communication, infrared, and the like). The user device may provide/transmit the plurality of images to the computing device and the computing device may determine an identity of the user and/or whether the user should be granted access to the user device.

At 820, a plurality of features/components of the user's face (e.g., facial features) may be determined. The computing device may determine the plurality of features/components of the user's face. Facial features/components of the user may be extracted from the plurality of images. Facial features/components may comprise precise measurements and/or descriptions associated with a user's face such as the user's nose, eyes, lips, ears, distinguishing marks (e.g., moles, birthmarks, blemishes, tattoos, etc. . . . ), facial dimensions, reference points, and the like. The computing device may store the extracted facial features/components in storage (e.g., the database 114, the storage module 106, etc. . . . ). For example, one or more images of a user (e.g., images capturing the user's face) and/or extracted facial features/components may be stored for authentication purposes during (as part of) a registration/enrollment process (e.g., process 200, etc. . . . ). The registration/enrollment process may be performed, for example, when the user configures security settings for the user device.

At 830, a facial recognition threshold may be determined to be satisfied. For example, a correspondence/match between the one or more facial features/components and one or more stored facial features/components of the user may be determined. The computing device may determine the correspondence/match between the one or more facial features/components and one or more stored facial features/components of the user. The computing device may use reference points (e.g., facial components, etc. . . . ) from the captured one or more images to identify the user's face. For example, an image of the one or more images may comprise reference points (e.g., facial components, etc. . . . ) that correspond to reference points of another image. The computing device may match/compare the reference points associated with the image to corresponding reference points of the other image. For example, a match/comparison between reference points from the respective images may indicate that the user faces are the same (e.g., substantially the same). The match/comparison between the reference points may be based on an error/discrepancy threshold and/or tolerance. For example, each reference point may not have to match. A first threshold may be satisfied if only two reference points of the image match two reference points of the other image. An image may comprise any number of reference points (e.g., facial components). The first threshold may be any value and/or setting. The computing device may identify the user's face (e.g., facial components associated with the user's face, etc. . . . ) despite factors such as the user's emotion (e.g., mood, temperament, unique pronunciation, etc. . . . ) when providing the password, the passphrase, or the like. If the computing device is unable to match the extracted facial features/components with the stored facial features/components, user authentication may fail. If the user authentication fails, the computing device may notify the user device and the user may be denied access to the user device and/or information associated with the user device. If the computing device is able to match the extracted facial features/components with the stored facial features/components, at least a portion of user authentication may pass. If the portion of user authentication passes, the computing device may perform further analysis of the plurality of images.

At 840, one or more visemes may be determined. The computing device may determine that one or more facial features of the plurality of facial features comprise one or more visemes. The computing device may determine the one or more visemes from the plurality of images. For example, the computing device may generate/extract a sequence of images (e.g., extracted from the plurality of images) of the user's lips when the user provides the password, the passphrase, or the like to the user device. The computing device may generate, determine, and/or classify the one or more visemes corresponding to the sequence of images of the user's lips. For example, each image of the sequence of images of the user's lips (e.g., extracted from the plurality of images) may be associated with a timestamp. The timestamps may be used to correlate the one or more visemes with one or more stored visemes (e.g., stored in the database 114, stored in the storage module 106, etc. . . . ). The stored visemes may be associated with a stored password, a stored passphrase, or the like that is stored during a registration/enrollment process (e.g., process 200, etc. . . . ). The registration/enrollment process may be performed, for example, when the user configures security settings for the user device.

At 850, a correspondence between the one or more visemes and one or more stored visemes can be determined. For example, a correspondence/match between the one or more visemes and the one or more stored visemes may be determined. The computing device may determine the match between the one or more visemes and the one or more stored visemes. A time series recording (e.g., a plurality of time stamped images, etc. . . . ) of the user speaking the password, the passphrase, or the like may comprise the one or more visemes. The one or more visemes may be used to articulate the password, the passphrase, or the like. The one or more (e.g., timestamps associated with the plurality of visemes, etc. . . . ) may be compared/matched to the one or more stored visemes (e.g., timestamps associated with the plurality of stored visemes, etc. . . . ) to determine if the user's lip structure determined when the user provides the password, the passphrase, or the like, matches stored information (e.g., a stored password, a stored passphrase, etc. . . . ) associated with the plurality of stored visemes. Despite factors such as tone, inflection, and other attributes of articulation, each viseme associated with each sound (e.g., phoneme) made when speaking a password, a passphrase, or the like should be the same (e.g., substantially the same) each time the user speaks/provides the password, the passphrase, or the like. The match/comparison between the one or more visemes and the one or more stored visemes may be based on an error/discrepancy threshold and/or tolerance. The match/comparison between the one or more visemes and the one or more stored visemes may comprise error correction and/or normalization which accounts for the error/discrepancy threshold and/or tolerance. The error correction and/or normalization may enable discriminate identification of the one or more visemes. For example, the computing device may correlate the one or more visemes (e.g., timestamps associated with the plurality of visemes, etc. . . . ) to the one or more stored visemes (e.g., timestamps associated with the one or more stored visemes, etc. . . . ) despite external factors such as lighting, angle, and the like associated with the plurality of images from which the one or more visemes and/or the one or more stored visemes are extracted/determined. The computing device may use fuzzy logic to correlate the plurality of visemes to the one or more stored visemes.

The computing device may determine that the correspondence/match between the one or more visemes and the one or more stored visemes satisfies a second threshold. For example, the computing device may correlate the one or more visemes to the one or more stored visemes despite factors such as the user's emotion (e.g., mood, temperament, unique pronunciation, etc. . . . ) when providing the password, the passphrase, or the like used to determine the plurality of images, one or more visemes and/or the one or more stored visemes. The computing device may use reference points (e.g., facial components, etc. . . . ) to correlate a viseme of the one or more visemes to a viseme of the one or more stored visemes. For example, the viseme of one or more visemes may comprise reference points (e.g., facial components, etc. . . . ) that correspond to reference points of the viseme of the one or more stored visemes. The computing device may match/compare the reference points associated with the viseme of the one or more visemes to corresponding reference points of the viseme of one or more stored visemes. A match/comparison between reference points from the viseme of the one or more visemes to the viseme of the one or more stored visemes may indicate that the respective visemes are the same (e.g., substantially the same). An inability to match/compare reference points from the viseme of the one or more visemes to the viseme of the one or more stored visemes may indicate that the respective visemes are different. The match/comparison between the reference points may be based on an error/discrepancy threshold (e.g., second threshold, etc. . . . ) and/or tolerance. For example, each reference point may not have to match. The second threshold may be satisfied if only two reference points of a viseme of the one or more visemes match two reference points of a viseme of the one or more stored visemes. A sequence of visemes (e.g., a one or more visemes, etc. . . . ) may comprise any number of reference points (e.g., facial components). The threshold may be any value and/or setting.

At 860, a notification may be provided/transmitted to the user device. The computing device may provide/transmit the notification the user device. The computing device may provide/transmit the notification to the user device during a communication session between the computing device and the user device. The communication session may be based on a long-range communication technique (e.g., Internet, cellular, satellite, and the like). The communication session may be based on a short-range communication technique (e.g., BLUETOOTH®, near-field communication, infrared, and the like). The notification may be a based on an application, a text message, a signal, a ping, or the like. The notification may inform the user device that the first threshold and the second threshold are satisfied. The notification may cause the user device to provide the user access to the user device and/or information associated with the user device. Access to the user device may comprise the user device transitioning from a locked state to an unlocked state. Access to the user device may be based on satisfaction of any number of thresholds.

Figure 9:
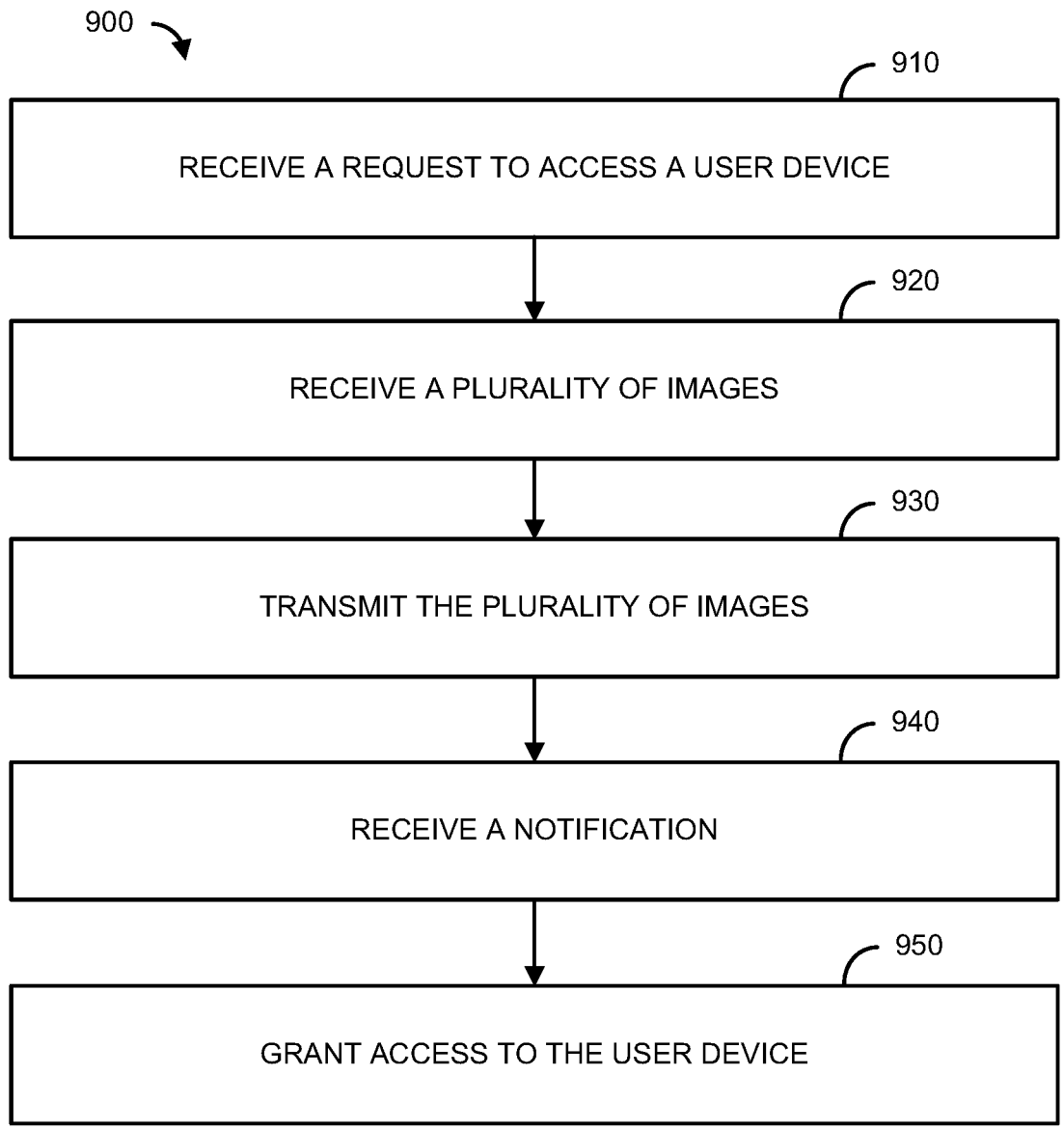
FIG. 9 is a flowchart of an example method for user authentication.

FIG. 9 is a flowchart of an example method 900 for user authentication. At 910, a request to access a user device can be received. For example, a request may be received from a user attempting to access a user device. The user device (e.g., the user device 102, a smartphone, a computer, a laptop, a tablet, etc. . . . ) may receive the request for access. The user device may receive the request for access from a user attempting to cause to the user device to unlock from a locked state and/or access information associated with the user device. The user device may detect and/or determine that the user is attempting to access the user device and the user device may provide a notification, an indication, or the like to/for the user to provide a password, a passphrase, or the like before access to the user device is granted.

The user device may comprise an interface that the user may use to provide/input a password, a passphrase, or the like. For example, the user may use a keyboard, touchscreen, touchpad, or the like to type/input the password, the passphrase, or the like. The user device may detect/receive an audible version of the password, the passphrase, or the like via a microphone (e.g., a sensor, a voice capturing component, etc. . . . ) configured/associated with the user device. The user device may use natural language and/or speech-to-text processing to convert the audible password (or audible passphrase) to text and/or data indicative of the audible password (or audible passphrase) that may be processed further.

The text and/or data indicative of the audible password (or audible passphrase) may be processed further to determine whether the text and/or data indicative of the audible password (or audible passphrase) matches the password, the passphrase, or the like typed/input by the user. The text and/or data indicative of the audible password (or audible passphrase) may be processed further to determine whether the text and/or data indicative of the audible password (or audible passphrase) matches stored information (e.g., a stored password, a stored passphrase, etc. . . . ) associated with the user device and/or user.

At 920, a plurality of images can be received. For example, a plurality of images of the user may be determined/received/acquired/captured/scanned. The user device may comprise a camera (e.g., an image capturing device, etc. . . . ). The camera may capture one or more images (e.g., photographs, video, etc. . . . ) of a face of the user providing/speaking the password, the passphrase, or the like. The plurality of images may comprise a plurality of facial features of the user. The user device may determine the plurality of facial features. Facial features/components of the user may be extracted from the one or more images of the user's face. Facial features/components may comprise precise measurements and/or descriptions associated with a user's face such as the user's nose, eyes, lips, ears, distinguishing marks (e.g., moles, birthmarks, blemishes, tattoos, etc. . . . ), facial dimensions, reference points of analysis, and the like. The user device may store the extracted facial features/components in storage (e.g., the storage module 106, the database 114, etc. . . . ). For example, one or more images of a user (e.g., images capturing the user's face) and/or extracted facial features/components may be stored for authentication purposes during (as part of) a registration/enrollment process (e.g., process 200, etc. . . . ). The registration/enrollment process may be performed, for example, when the user configures security settings for the user device.

At 930, the plurality of images may be transmitted. For example, the user device can transmit/provide the plurality of images to a computing device (e.g., the computing device 104, a server, a cloud-based device, etc. . . . ). The plurality of images may be transmitted to the computing device during a communication session between the user device and the computing device. The communication session between the user device and the computing device may be based on a long-range communication technique (e.g., Internet, cellular, satellite, and the like). The communication session between the user device and the computing device may be based on a short-range communication technique (e.g., BLUETOOTH®, near-field communication, infrared, and the like).

The user device may transmit/provide the plurality of images to the computing device and the computing device may determine an identity of the person and/or whether the person should be granted access to the user device. For example, the computing device can determine a plurality of facial features associated with the user (e.g., components of the user's face) from the plurality of images. Facial features/components of the user may be extracted from the plurality of images. Facial features/components may comprise precise measurements and/or descriptions associated with a user's face such as the user's nose, eyes, lips, ears, distinguishing marks (e.g., moles, birthmarks, blemishes, tattoos, etc. . . . ), facial dimensions, reference points, and the like. The computing device may store the extracted facial features/components in storage (e.g., the database 114, the storage module 106, etc. . . . ). For example, one or more images of a user (e.g., images capturing the user's face) and/or extracted facial features/components may be stored for authentication purposes during (as part of) a registration/enrollment process (e.g., process 200, etc. . . . ). The registration/enrollment process may be performed, for example, when the user configures security settings for the user device.

A facial recognition threshold may be determined to be satisfied. The computing device can determine that the facial recognition threshold is satisfied. For example, a correspondence/match between the one or more facial features/components and one or more stored facial features/components of the user may be determined. The computing device may determine the correspondence/match between the one or more facial features/components and one or more stored facial features/components of the user. The computing device may use reference points (e.g., facial components, etc. . . . ) from the captured one or more images to identify the user's face. For example, an image of the one or more images may comprise reference points (e.g., facial components, etc. . . . ) that correspond to reference points of another image. The computing device may match/compare the reference points associated with the image to corresponding reference points of the other image. For example, a match/comparison between reference points from the respective images may indicate that the user faces are the same (e.g., substantially the same). The match/comparison between the reference points may be based on an error/discrepancy threshold and/or tolerance. For example, each reference point may not have to match. A first threshold may be satisfied if only two reference points of the image match two reference points of the other image. An image may comprise any number of reference points (e.g., facial components). The first threshold may be any value and/or setting. The computing device may identify the user's face (e.g., facial components associated with the user's face, etc. . . . ) despite factors such as the user's emotion (e.g., mood, temperament, unique pronunciation, etc. . . . ) when providing the password, the passphrase, or the like. If the computing device is unable to match the extracted facial features/components with the stored facial features/components, user authentication may fail. If the user authentication fails, the computing device may notify the user device and the user may be denied access to the user device and/or information associated with the user device. If the computing device is able to match the extracted facial features/components with the stored facial features/components, at least a portion of user authentication may pass. If the portion of user authentication passes, the computing device may perform further analysis of the plurality of images.

One or more visemes may be determined. The computing device can determine the one or more visemes. For example, the computing device may determine that one or more facial features of the plurality of facial features comprise one or more visemes. The computing device may determine the one or more visemes from the plurality of images. The computing device may generate/extract a sequence of images (e.g., extracted from the plurality of images) of the user's lips when the user provides the password, the passphrase, or the like to the user device. The computing device may generate, determine, and/or classify the one or more visemes corresponding to the sequence of images of the user's lips. For example, each image of the sequence of images of the user's lips (e.g., extracted from the plurality of images) may be associated with a timestamp. The timestamps may be used to correlate the one or more visemes with one or more stored visemes (e.g., stored in the database 114, stored in the storage module 106, etc. . . . ). The stored visemes may be associated with a stored password, a stored passphrase, or the like that is stored during a registration/enrollment process (e.g., process 200, etc. . . . ). The registration/enrollment process may be performed, for example, when the user configures security settings for the user device.

A correspondence between the one or more visemes and one or more stored visemes can be determined. The computing device can determine the correspondence between the one or more visemes and one or more stored visemes. A time series recording (e.g., a plurality of time stamped images, the plurality of images, etc. . . . ) of the user speaking the password, the passphrase, or the like may comprise the one or more visemes. The one or more visemes may be used to articulate the password, the passphrase, or the like. The one or more (e.g., timestamps associated with the plurality of visemes, etc. . . . ) may be compared/matched to the one or more stored visemes (e.g., timestamps associated with the plurality of stored visemes, etc. . . . ) to determine if the user's lip structure determined when the user provides the password, the passphrase, or the like, matches stored information (e.g., a stored password, a stored passphrase, etc. . . . ) associated with the plurality of stored visemes. Despite factors such as tone, inflection, and other attributes of articulation, each viseme associated with each sound (e.g., phoneme) made when speaking a password, a passphrase, or the like should be the same (e.g., substantially the same) each time the user speaks/provides the password, the passphrase, or the like. The match/comparison between the one or more visemes and the one or more stored visemes may be based on an error/discrepancy threshold and/or tolerance. The match/comparison between the one or more visemes and the one or more stored visemes may comprise error correction and/or normalization which accounts for the error/discrepancy threshold and/or tolerance. The error correction and/or normalization may enable discriminate identification of the one or more visemes. For example, the computing device may correlate the one or more visemes (e.g., timestamps associated with the plurality of visemes, etc. . . . ) to the one or more stored visemes (e.g., timestamps associated with the one or more stored visemes, etc. . . . ) despite external factors such as lighting, angle, and the like associated with the plurality of images from which the one or more visemes and/or the one or more stored visemes are extracted/determined. The computing device may use fuzzy logic to correlate the plurality of visemes to the one or more stored visemes.

The computing device may determine that the correspondence/match between the one or more visemes and the one or more stored visemes satisfies a second threshold. For example, the computing device may correlate the one or more visemes to the one or more stored visemes despite factors such as the user's emotion (e.g., mood, temperament, unique pronunciation, etc. . . . ) when providing the password, the passphrase, or the like used to determine the plurality of images, one or more visemes and/or the one or more stored visemes. The computing device may use reference points (e.g., facial components, etc. . . . ) to correlate a viseme of the one or more visemes to a viseme of the one or more stored visemes. For example, the viseme of one or more visemes may comprise reference points (e.g., facial components, etc. . . . ) that correspond to reference points of the viseme of the one or more stored visemes. The computing device may match/compare the reference points associated with the viseme of the one or more visemes to corresponding reference points of the viseme of one or more stored visemes. A match/comparison between reference points from the viseme of the one or more visemes to the viseme of the one or more stored visemes may indicate that the respective visemes are the same (e.g., substantially the same). An inability to match/compare reference points from the viseme of the one or more visemes to the viseme of the one or more stored visemes may indicate that the respective visemes are different. The match/comparison between the reference points may be based on an error/discrepancy threshold (e.g., second threshold, etc. . . . ) and/or tolerance. For example, each reference point may not have to match. The second threshold may be satisfied if only two reference points of a viseme of the one or more visemes match two reference points of a viseme of the one or more stored visemes. A sequence of visemes (e.g., a one or more visemes, etc. . . . ) may comprise any number of reference points (e.g., facial components). The threshold may be any value and/or setting.

At 940, a notification can be received. The notification may be received by the user device. The computing device may provide/transmit the notification the user device. The computing device may provide/transmit the notification to the user device during a communication session between the computing device and the user device. The communication session may be based on a long-range communication technique (e.g., Internet, cellular, satellite, and the like). The communication session may be based on a short-range communication technique (e.g., BLUETOOTH®, near-field communication, infrared, and the like). The notification may be a based on an application, a text message, a signal, a ping, or the like. The notification may inform the user device that the first threshold and the second threshold are satisfied. The notification may cause the user device to provide the user access to the user device and/or information associated with the user device. Access to the user device may comprise the user device transitioning from a locked state to an unlocked state. Access to the user device may be based on satisfaction of any number of thresholds.

At 950, access may be granted to the user device. The user device may grant the user access to the user device and/or information associated with the user device. Access to the user device may comprise the user device transitioning from a locked state to an unlocked state. Access to the user device may be based on the facial recognition threshold being satisfied and the correspondence/match between the one or more visemes and the one or more stored visemes. Access to the user device may be based on satisfaction of any number of thresholds.

Figure 10:
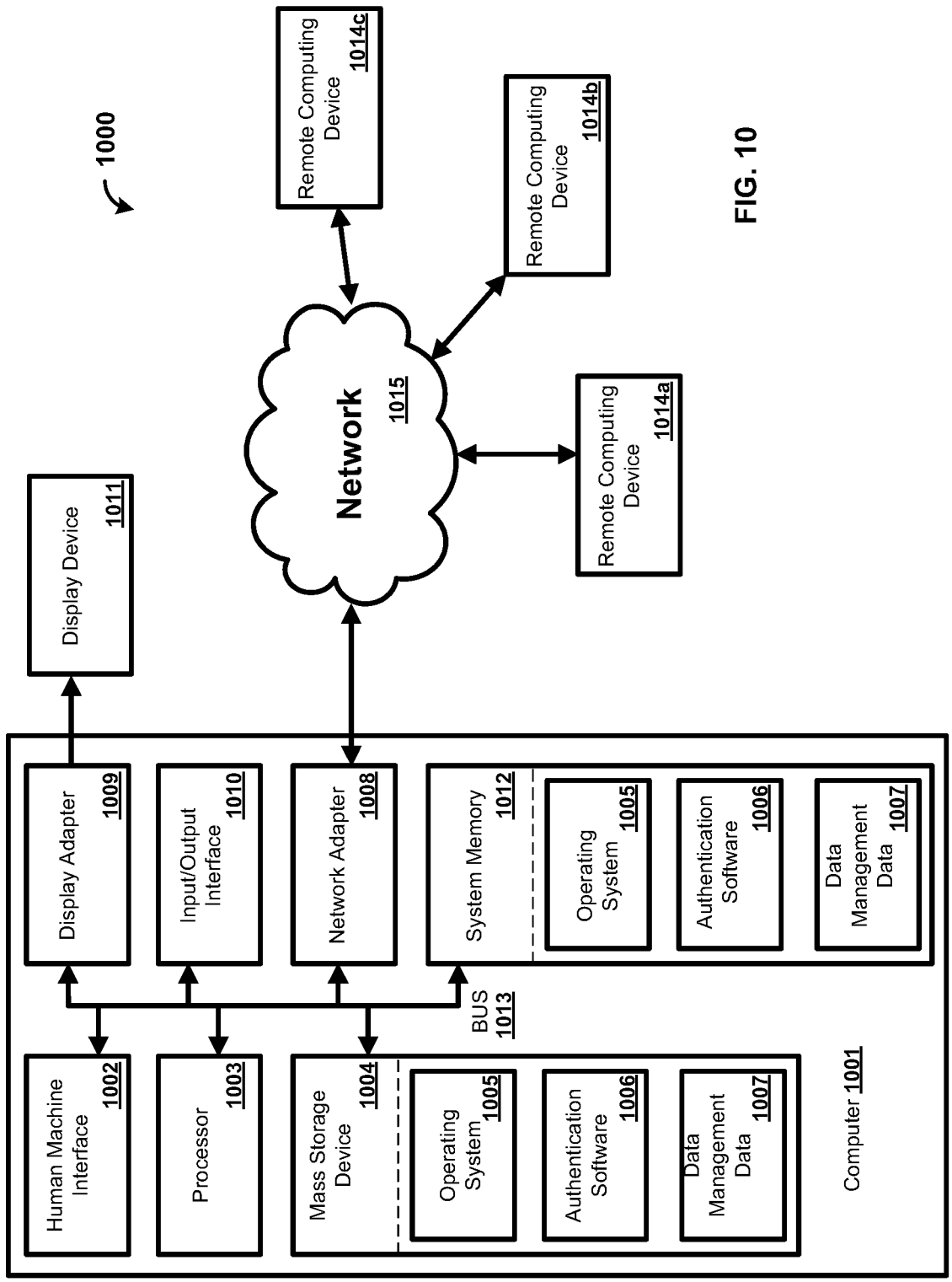
FIG. 10 is a block diagram of an example computing device for user authentication.

FIG. 10 shows a computer 1001 for user authentication. The user device 102, the computing device 104, or any other device described herein may be a computer described in FIG. 10. One or more computers may perform one or more functions in one or more locations. The computer 1001 may comprise, but are not limited to, one or more processors 1003, a system memory 1012, and a system bus 1013 that couples various system components including the one or more processors 1003 to the system memory 1012. The system may utilize parallel computing.

The bus 1013 represents one or more of several possible types of bus structures, including a memory bus or memory controller, a peripheral bus, an accelerated graphics port, or local bus using any of a variety of bus architectures. By way of example, such architectures may comprise an Industry Standard Architecture (ISA) bus, a Micro Channel Architecture (MCA) bus, an Enhanced ISA (EISA) bus, a Video Electronics Standards Association (VESA) local bus, an Accelerated Graphics Port (AGP) bus, and a Peripheral Component Interconnects (PCI), a PCI-Express bus, a Personal Computer Memory Card Industry Association (PCM-CIA), Universal Serial Bus (USB) and the like. The bus 1013, and all buses specified in this description may also be implemented over a wired or wireless network connection and each of the subsystems, including the one or more processors 1003, a mass storage device 1004, an operating system 1005, user authentication software 1006, authentication data 1007, a network adapter 1008, the system memory 1012, an Input/Output Interface 1010, a display adapter 1009, a display device 1011, and a human machine interface 1002, may be contained within one or more remote computing devices 1014a,b,c at physically separate locations, connected through buses of this form, in effect implementing a fully distributed system.

The computer 1001 typically comprises a variety of computer readable media (e.g., non-transitory). Example readable media may be any available media that is accessible by the computer 1001 and comprises, for example, both volatile and non-volatile media, removable and non-removable media. The system memory 1012 comprises computer readable media in the form of volatile memory, such as random access memory (RAM), and/or non-volatile memory, such as read only memory (ROM). The system memory 1012 typically contains data such as the authentication data 1007 and/or program modules such as the operating system 1005 and the authentication software 1006 that are immediately accessible to and/or are presently operated on by the one or more processors 1003.

The computer 1001 may also comprise other removable/non-removable, volatile/non-volatile computer storage media. The mass storage device 1004 may provide non-volatile storage of computer code, computer readable instructions, data structures, program modules, and other data for the computer 1001. The mass storage device 1004 may be a hard disk, a removable magnetic disk, a removable optical disk, magnetic cassettes or other magnetic storage devices, flash memory cards, CD-ROM, digital versatile disks (DVD) or other optical storage, random access memories (RAM), read only memories (ROM), electrically erasable programmable read-only memory (EEPROM), and the like.

Any number of program modules may be stored on the mass storage device 1004, including the operating system 1005 and the authentication software 1006. Each of the operating system 1005 and the authentication software 1006 (or some combination thereof) may comprise elements of the programming and the authentication software 1006. The authentication data 1007 may also be stored on the mass storage device 1004. The authentication data 1007 may be stored in any of one or more databases known in the art. Examples of such databases comprise, DB2®, Microsoft® Access, Microsoft® SQL Server, Oracle®, MySQL, PostgreSQL, and the like. The databases may be centralized or distributed across multiple systems.

A user may enter commands and information into the computer 1001 via an input device (not shown). Examples of such input devices comprise, but are not limited to, a keyboard, pointing device (e.g., a "mouse"), a microphone, a joystick, a scanner, tactile input devices such as gloves, and other body coverings, and the like These and other input devices may be connected to the one or more processors 1003 via the human machine interface 1002 that is coupled to the system bus 1013, but may be connected by other interface and bus structures, such as a parallel port, game port, an IEEE 1394 Port (also known as a Firewire port), a serial port, or a universal serial bus (USB).

The display device 1011 may also be connected to the system bus 1013 via an interface, such as the display adapter 1009. The computer 1001 may have more than one display adapter 1009 and the computer 1001 may have more than one display device 1011. For example, the display device 1011 may be a monitor, an LCD (Liquid Crystal Display), or a projector. Other output peripheral devices may also comprise components such as speakers (not shown) and a printer (not shown) which may be connected to the computer 1001 via the Input/Output Interface 1010. Any step and/or result of the methods may be output in any form to an output device. Such output may be any form of visual representation, including, but not limited to, textual, graphical, animation, audio, tactile, and the like. The display device 1011 and computer 1001 may be part of one device, or separate devices.

The computer 1001 may operate in a networked environment using logical connections to one or more remote computing devices 1014*a,b,c*. A remote computing device may be a personal computer, portable computer, smartphone, a server, a router, a network computer, a peer device or other common network node, and so on. Logical connections between the computer 1001 and a remote computing device 1014*a,b,c* may be made via a network 1015, such as a local area network (LAN) and/or a general wide area network (WAN). Such network connections may be through the network adapter 1008. The network adapter 1008 may be implemented in both wired and wireless environments. Application programs and other executable program components such as the operating system 1005 are depicted herein as discrete blocks, although such programs and components may reside at various times in different storage components of the computing device 1001, and be executed by the one or more processors 1003 of the computer. An implementation of the authentication software 1006 may be stored on or transmitted across some form of computer readable media. Any of the described methods may be performed by computer readable instructions embodied on computer readable media. Computer readable media may be any available media that may be accessed by a computer. By way of example and not meant to be limiting, computer readable media may comprise "computer storage media" and "communications media." "Computer storage media" comprise volatile and non-volatile, removable and non-removable media implemented in any methods or technology for storage of information such as computer readable instructions, data structures, program modules, or other data. Example computer storage media comprises, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which may be used to store the desired information and which may be accessed by a computer.

User authentication and examples described herein may employ Artificial Intelligence techniques such as machine learning and iterative learning. Examples include, but are not limited to, expert systems, case based reasoning, Bayesian networks, behavior based AI, neural networks, fuzzy systems, evolutionary computation (e.g. genetic algorithms), swarm intelligence (e.g. ant algorithms), and hybrid intelligent systems (e.g. Expert inference rules generated through a neural network or production rules from statistical learning).

Although examples are described, it is not intended that the scope be limited to the particular example set forth, as the examples herein are intended in all respects to be example rather than restrictive.

Unless otherwise expressly stated, it is in no way intended that any example and/or method described herein be construed as requiring that its steps be performed in a specific order. Accordingly, where a method claim does not actually recite an order to be followed by its steps or it is not otherwise specifically stated in the claims or descriptions that the steps are to be limited to a specific order, it is in no way intended that an order be inferred, in any respect. This holds for any possible non-express basis for interpretation, including: matters of logic with respect to arrangement of steps or operational flow; plain meaning derived from grammatical organization or punctuation; the number or type of examples described in the specification.

It will be apparent to those skilled in the art that various modifications and variations may be made without departing from the scope or spirit. Other examples will be apparent to those skilled in the art from consideration of the specification and practice disclosed herein. It is intended that the specification and examples be considered as example only, with a true scope and spirit being indicated by the following claims.

The invention claimed is:

1. A method, comprising:
   based on a request to access a user device, determining one or more visemes associated with a user;
   determining a correspondence between the one or more visemes of the user and one or more stored visemes of the user satisfies a threshold; and
   granting, based on the correspondence between the one or more visemes of the user and the one or more stored visemes of the user satisfying the threshold, access to the user device.

2. The method of claim 1, wherein the user device comprises a voice-enabled device.

3. The method of claim 1, wherein receiving the request to access the user device comprises detecting a spoken request to access one or more applications associated with the user device.

4. The method of claim 1, wherein the one or more visemes comprise one or more facial movements associated with the user speaking one or more words.

5. The method of claim 1, wherein granting access to the user device comprises at least one of: activating the user device, transitioning the user device from a locked state to an unlocked state, outputting content, or launching one or more applications associated with the user device.

6. The method of claim 1, wherein determining the one or more visemes associated with the user comprises receiving one or more images of the user speaking one or more words.

7. The method of claim 1, further comprising:
extracting, from at least one image of a plurality of images of the user, a plurality of facial features associated with the user;
determining, based on at least one facial feature of the plurality of facial features, that a facial recognition threshold is satisfied; and
granting, based on the facial recognition threshold being satisfied, access to the user device.

8. A method, comprising:
receiving, by a computing device from a user device, one or more images of a user, wherein each image of the one or more images comprises one or more visemes associated with a user of the user device;
determining, based on the one or more images of the user, a correspondence between the one or more visemes of the user and one or more stored visemes of the user satisfies a threshold; and
sending, based on the correspondence satisfying the threshold, to the user device, a notification of the correspondence.

9. The method of claim 8, further comprising:
receiving a request to access the user device;
capturing, by the user device, the one or more images; and
sending, to the computing device, based on the request to access the user device, the one or more images of the user.

10. The method of claim 9, wherein receiving the request comprises the user speaking one or more words, and wherein the request comprises one or more of a request for the user device to transition from a locked state to an unlocked state or a request to access information associated with the user device.

11. The method of claim 9, wherein receiving the request to access the user device comprises detecting a spoken request to access one or more applications associated with the user device.

12. The method of claim 8, further comprising providing, based on the notification, access to the user device, wherein access to the user device comprises one or more of the user device transitioning from a locked state to an unlocked state, or access to information associated with the user device.

13. The method of claim 8, further comprising:
determining, based on the one or more images of the user and one or more stored images of the user, one or more facial features in the one or more images of the user and one or more facial features in the one or more stored images of the user;
determining, based on the one or more facial features in the one or more images of the user and the one or more facial features in the one or more stored images of the user, a facial recognition threshold is satisfied; and
sending, based on the facial recognition threshold being satisfied, a notification of the threshold being satisfied.

14. A method, comprising:
receiving, based on a request to access a user device, a plurality of images comprising one or more visemes associated with a user;
sending, to a computing device, the plurality of images;
receiving, from the computing device, a notification indicating at least one viseme of the one or more visemes associated with the user corresponds to one or more stored visemes associated with the user; and
granting, based on the notification, access to the user device.

15. The method of claim 14, wherein each visemes of the one or more stored visemes associated with the user each comprise an image of the user speaking one or more words.

16. The method of claim 15, wherein the one or more words are associated with a user profile.

17. The method of claim 14, further comprising determining, based on the one or more visemes associated with the user and the at least one viseme, a facial recognition threshold is satisfied.

18. The method of claim 14, further comprising extracting, from the plurality of images and the at least one viseme, one or more facial features.

19. The method of claim 14, wherein granting the access to the user device comprises one or more of the user device transitioning from a locked state to an unlocked state, or granting the access to information associated with the user device.

20. The method of claim 14, further comprising launching, based on the access to the user device, one or more applications.

* * * * *